(12) United States Patent
Bartley, II et al.

(10) Patent No.: US 9,822,494 B1
(45) Date of Patent: Nov. 21, 2017

(54) DECORATIVE GRATING AND METHOD OF MANUFACTURING THE SAME

(71) Applicant: Ohio Gratings, Inc., Canton, OH (US)

(72) Inventors: David W. Bartley, II, Canton, OH (US); John C. Bartley, Canton, OH (US); Thomas P. Gerber, Canton, OH (US)

(73) Assignee: Ohio Gratings, Inc., Canton, OH (US)

( * ) Notice: Subject to any disclaimer, the term of this patent is extended or adjusted under 35 U.S.C. 154(b) by 0 days.

(21) Appl. No.: 15/349,197

(22) Filed: Nov. 11, 2016

(51) Int. Cl.
| | |
|---|---|
| *E01C 9/00* | (2006.01) |
| *E01C 9/10* | (2006.01) |
| *E04C 2/42* | (2006.01) |
| *E03F 5/14* | (2006.01) |
| *B23P 15/12* | (2006.01) |
| *B33Y 10/00* | (2015.01) |

(52) U.S. Cl.
CPC ............ *E01C 9/10* (2013.01); *B23P 15/12* (2013.01); *B33Y 10/00* (2014.12); *E03F 5/14* (2013.01); *E04C 2/421* (2013.01)

(58) Field of Classification Search
CPC ... E01C 9/10; E04C 2/421; E03F 5/14; B33Y 10/00; B23P 15/12
USPC ............................................. 404/2, 4; 14/73
See application file for complete search history.

(56) References Cited

U.S. PATENT DOCUMENTS

| | | | | | |
|---|---|---|---|---|---|
| 1,479,651 | A | * | 1/1924 | Clements | E01F 9/541 362/152 |
| 4,968,170 | A | * | 11/1990 | Wilson | E04C 2/423 404/2 |
| 5,024,550 | A | * | 6/1991 | Mainville | E03F 5/06 210/163 |
| 7,160,048 | B1 | * | 1/2007 | Fattori | E01C 11/227 404/2 |
| 7,780,372 | B2 | * | 8/2010 | Fattori | E01C 11/223 404/2 |
| 8,535,523 | B2 | * | 9/2013 | Friezner | E03F 5/0404 210/156 |
| 9,752,315 | B1 | * | 9/2017 | Phillips | E03F 5/06 |

* cited by examiner

*Primary Examiner* — Raymond W Addie
(74) *Attorney, Agent, or Firm* — Sand & Sebolt

(57) ABSTRACT

A grating assembly and a method for manufacturing the same. The grating assembly comprises a plurality of crossbars that are secured together. The grating assembly includes a decorative image that is visible when approaching the grating. The image is formed by providing one or more image sections on one or more of the crossbars of the grating assembly. Each of the crossbars has a front surface and an opposed back surface and the one or more image sections are provided on one or both of the front surface and the back surface.

22 Claims, 23 Drawing Sheets

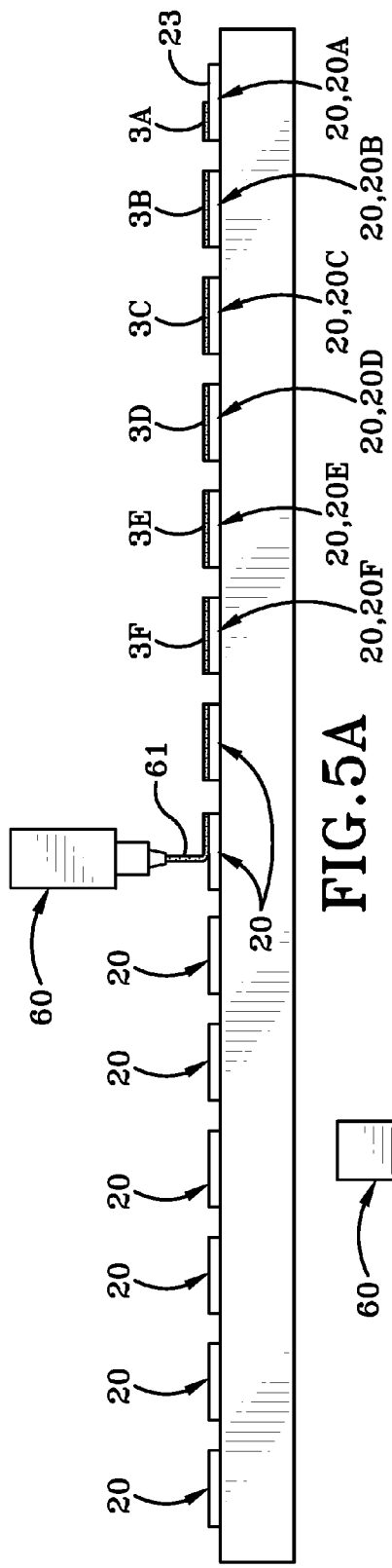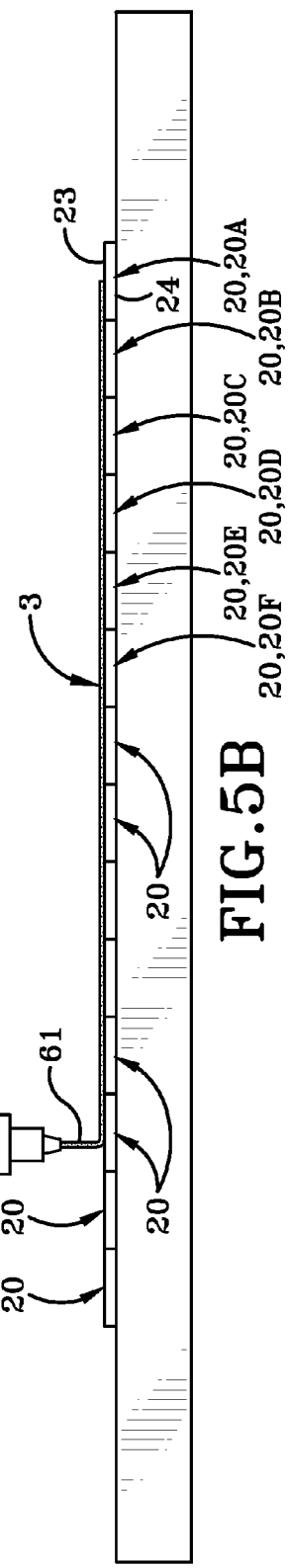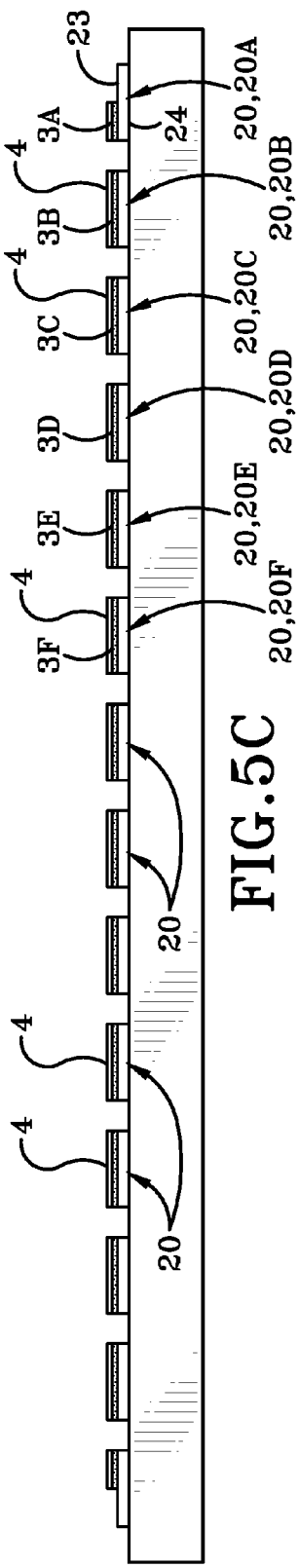
FIG.5A
FIG.5B
FIG.5C

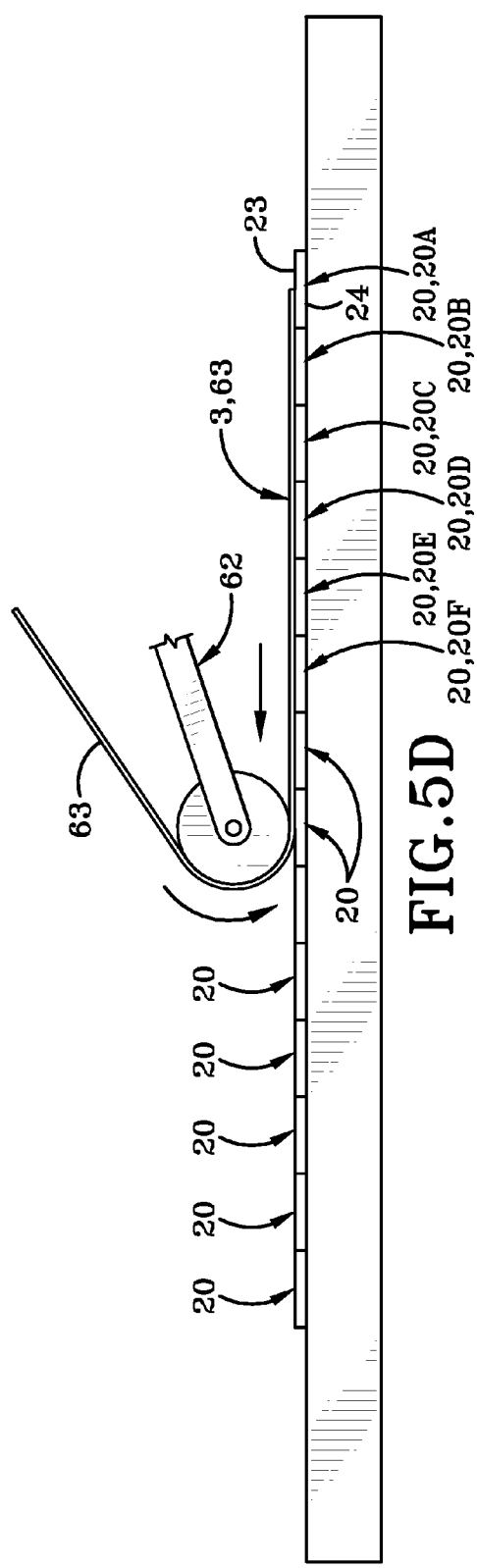
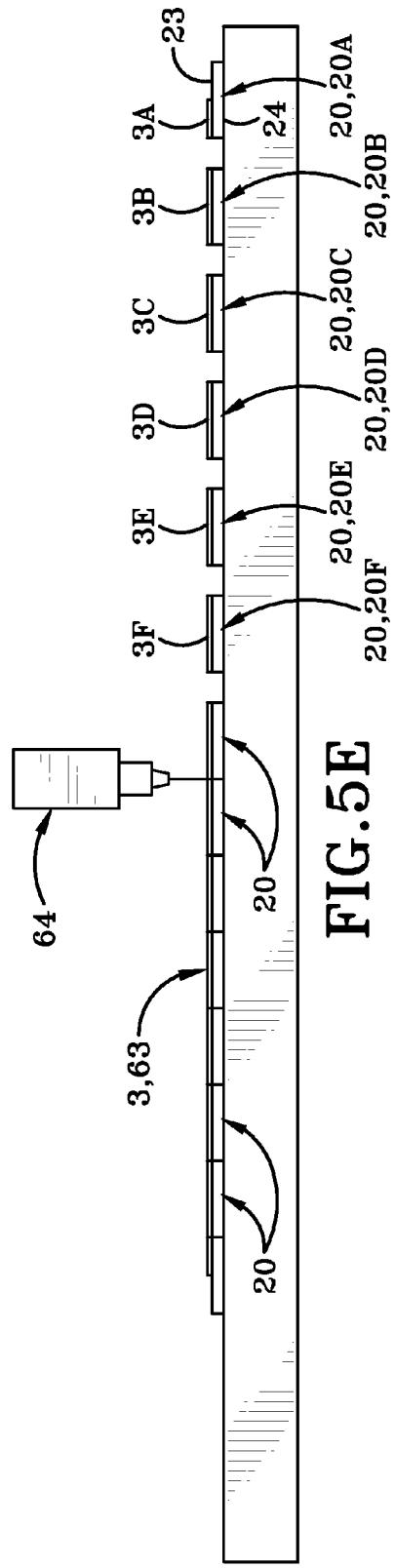
FIG.5D
FIG.5E

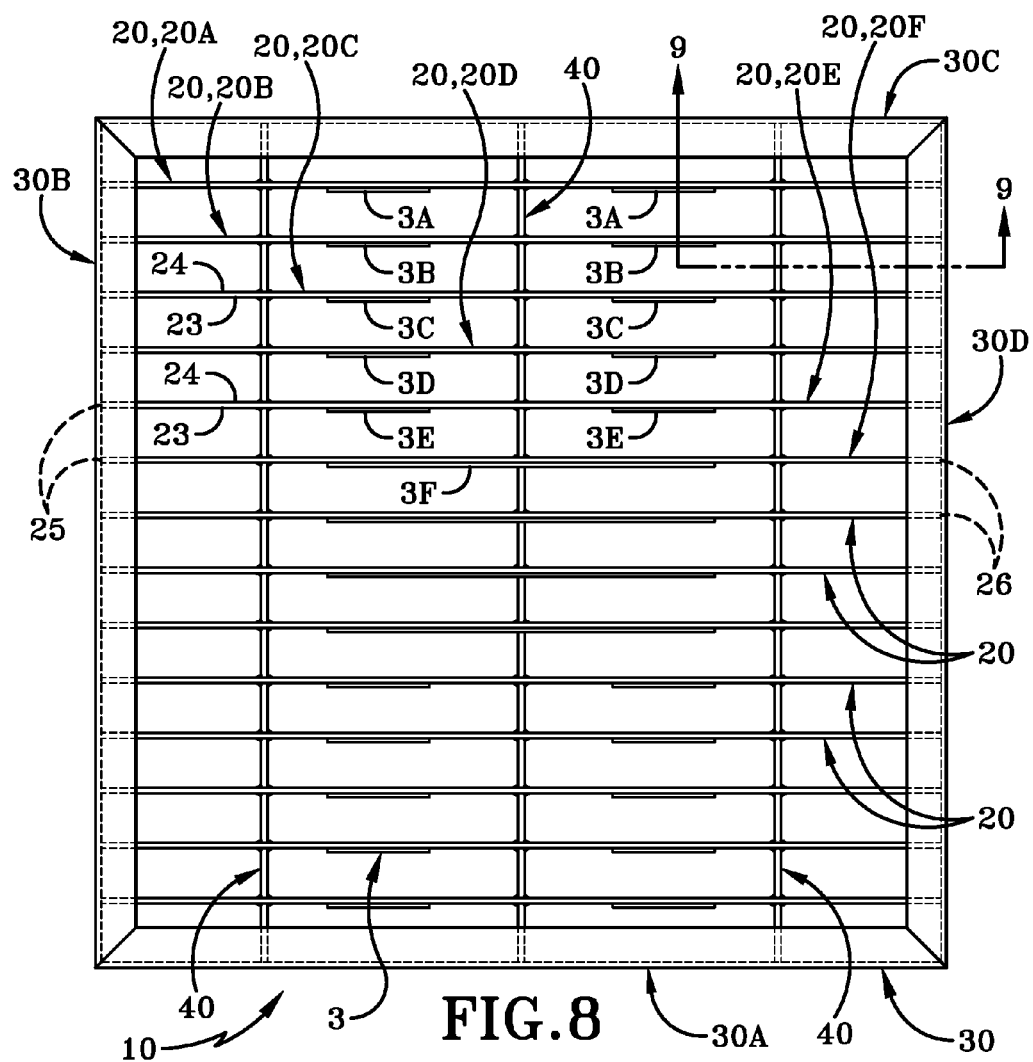
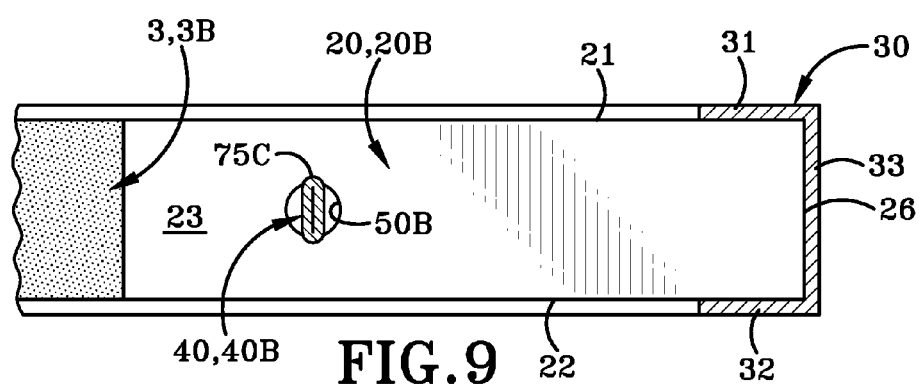

DECORATIVE GRATING AND METHOD OF MANUFACTURING THE SAME

BACKGROUND

Technical Field

Generally, the current disclosure relates to grates and to grating assemblies. More particularly, the current disclosure relates to a grating assembly that comprises a plurality of crossbars and which includes an image thereon. Specifically, the current disclosure is directed to an apparatus and method of manufacturing a grating assembly wherein the image provided thereon is comprised of smaller sections that are applied to individual crossbars, particularly to the front and/or back surfaces of the individual crossbars.

Background Information

A grating assembly may be any collection of metal bars arranged in a pattern and used to provide a surface upon which people walk or stand.

A grating assembly may be used in different places. For example, a grating assembly may be used for decks on bridges, footbridges, or catwalks. A grating assembly may be used to cover a drain as a filter to prevent large objects (such as paper, plastic or leaves) from dropping into the drain while allowing water to flow into the drain. A plurality of grating assemblies may be used together as stairs. In each instance, the pattern of the elongated grating elements used to fabricate the grating is chosen for the grating assembly's specific purpose. The material used to make the grating may also be chosen based on the grating's purpose. In many instances a grating assembly may be made out of a hard material such as metal or fiberglass. Suitable metals may be steel or aluminum.

SUMMARY

The grating assembly disclosed herein is provided with an image thereon which may be visible as a person approaches the assembly. The image is provided on the plurality of grating elements (i.e., crossbars). During the assembly of a grating, the grating elements (i.e., crossbars) may be welded together at high temperatures. If the image was applied to the grating assembly using paint then when the crossbars are welded together, at least some of the paint that has been applied to the crossbars may blister and peel off. This blistering and peeling of the paint will distort the image applied to the grating assembly. The inventor has recognized that it is possible to provide an image on a grating assembly and to preserve the integrity of that image by fabricating the grating assembly in a different manner than welding the grating elements to each other. It is therefore possible to provide an image on a grating assembly that is not damaged during fabrication of the grating assembly.

The inventor has recognized that an image may be formed by providing a portion of the overall image on some or all of the individual crossbars. The inventor also has recognized that the portion of the image does not need to be provided on the upper surface of the crossbar, but may be provided on a front surface and/or a back surface of the crossbar. The inventor has also recognized that the individual crossbars with portions of the overall image thereon may be secured together using any type of non-heated oriented method of securement. For example, the first and second crossbars may be connected together by a plurality of rods that pass through holes in the crossbars, and then pinching the rods at intervals to secure the rods and crossbars together. Alternatively, the first and second crossbars may have notches formed in them and the crossbars may be interlockingly engaged by orienting the crossbars at right angles and engaging the notched areas together.

The current disclosure is directed to a grating assembly and a method for manufacturing the same. The grating assembly comprises a plurality of crossbars that are secured together. The grating assembly includes a decorative image that is visible when approaching the grating. The image is formed by providing one or more image sections on one or more of the crossbars of the grating assembly. Each of the crossbars has a front surface and an opposed back surface and the one or more image sections are provided on one or both of the front surface and the back surface.

In one aspect, an embodiment of the present disclosure may provide a method of manufacturing a decorative grating assembly, comprising steps of 1) providing a first crossbar and a second crossbar, 2) placing the first and second crossbars a spaced distance from each other, and 3) providing one or more image sections on one or both of the first and second crossbars, wherein the one or more image sections together form an image that is visible a distance away from the first and second crossbars.

In another aspect, an embodiment of the present disclosure may provide a method of manufacturing a decorative grating assembly, comprising steps of 1) providing a first crossbar and a second crossbar, 2) placing the first and second crossbars at an angle relative to each other, and 3) providing one or more image sections on one or both of the first and second crossbars, wherein the one or more image sections together form an image that is visible a distance away from the first and second crossbars.

In another aspect, an embodiment of the present disclosure may provide a decorative grating assembly comprising a plurality of crossbars spaced a distance from each other and one or more image sections provided on one or more of the plurality of crossbars, wherein the image sections together, when seen from a distance, form an image on the grating assembly.

BRIEF DESCRIPTION OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the invention.

FIG. 5A is a side elevation view of a first method of providing an image on the plurality of crossbars;

FIG. 5B is a side elevation view of a second method of providing an image on the plurality of crossbars;

FIG. 5C is a side elevation view of the crossbars of FIG. 5B being separated from each other and showing a portion of the overall image provided on each of the individual crossbars;

FIG. 5D is a side elevation view of a fourth method of providing an image on a plurality of crossbars;

FIG. 5E is a side evaluation view of a knife being used to separate the plurality of crossbars shown in FIG. 5D;

FIG. 8 is a top plan view of a grating assembly showing the portions of the overall image being provided on only a front surface of the individual crossbars;

FIG. 9 is a partial front elevation view of an individual crossbar taken along line 9-9 of FIG. 8;

Similar numbers refer to similar parts throughout the drawings.

DETAILED DESCRIPTION OF THE EMBODIMENT

The present disclosure relates to an apparatus and method for fabricating a grating assembly which comprises a plurality of crossbars and for applying an image to that grating assembly.

Figure 1:
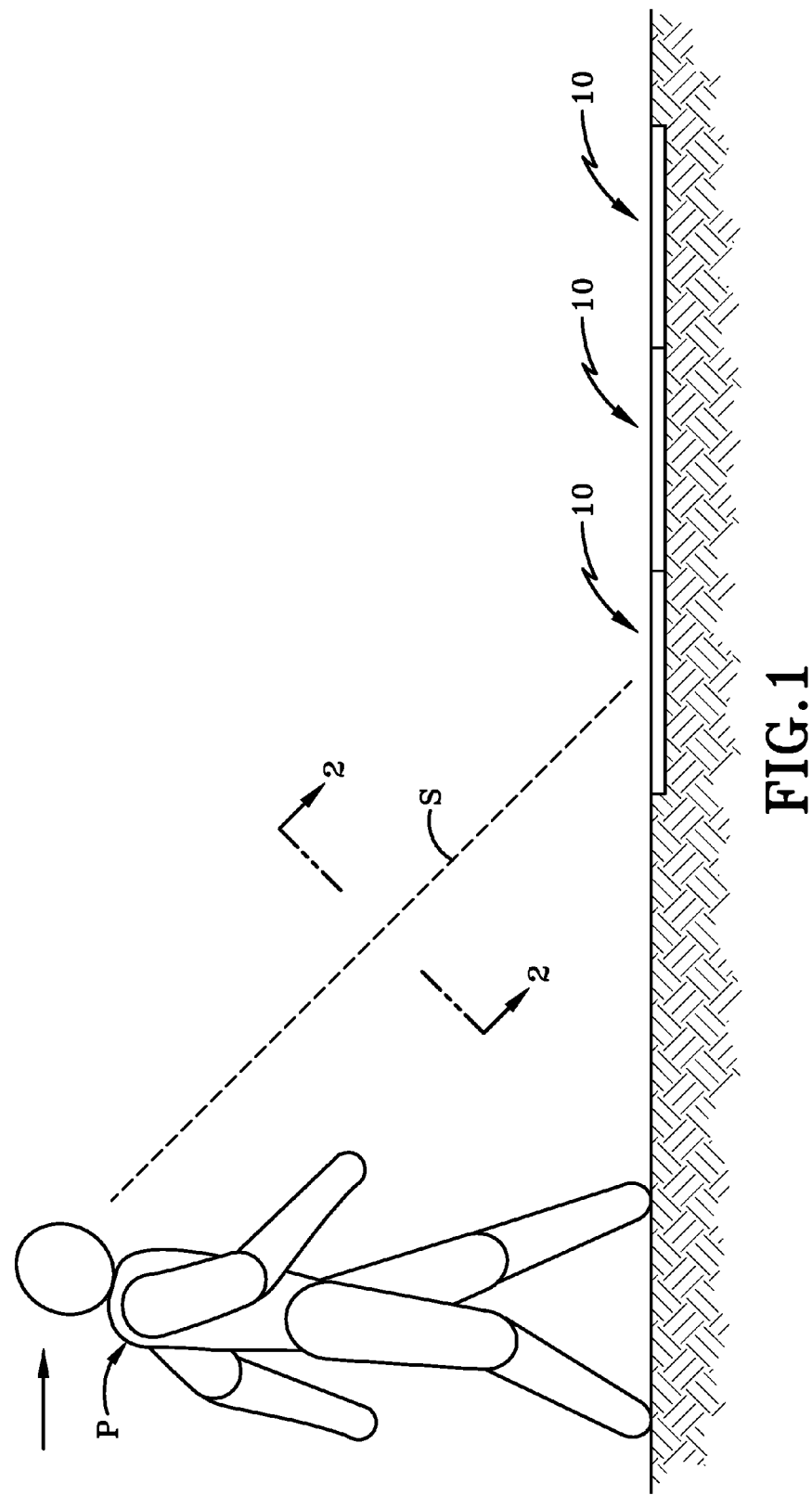
FIG. 1 is an exemplary environmental schematic view of a grating assembly in accordance with an aspect of the present invention.

FIG. 1 shows an exemplary view of a grating assembly 10 with a person P approaching the grating assembly 10. The person P sees an image 3 (shown in FIG. 2) along a line of sight S to the assembly 10. In this example, the grating assembly is shown deployed in the ground G. In other instances, it will be understood that the grating assembly 10 may be used in other applications or locations, for example as part of a deck, set of stairs or a catwalk.

Figure 2:
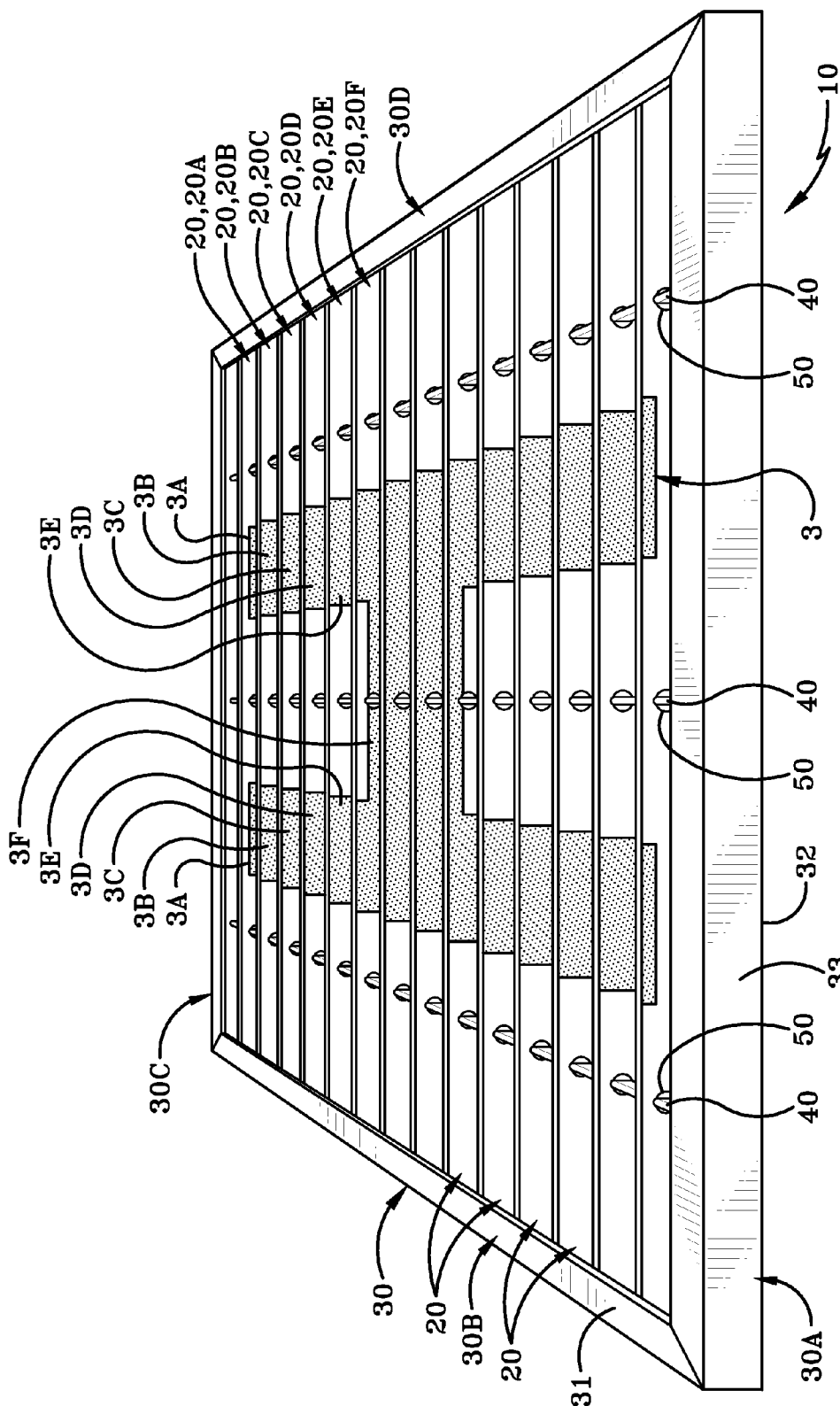
FIG. 2 is a top perspective view of a first embodiment of the grating assembly showing a frame surrounding a plurality of crossbars that are secured to each other by a plurality of connector rods.
Figure 4:
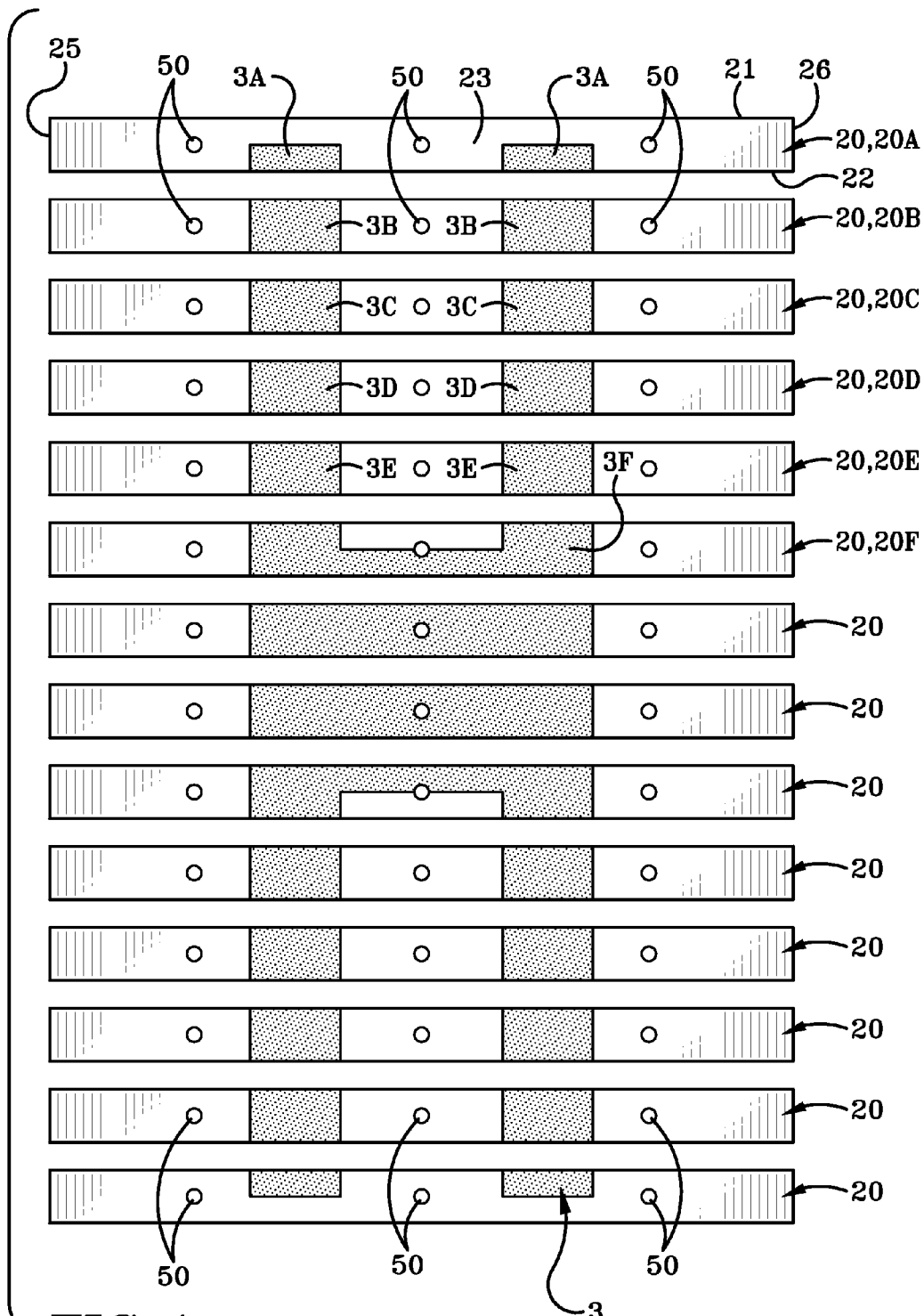
FIG. 4 is a top plan view of the crossbars of the grating assembly that are shown with their back surfaces all aligned in the same plane and showing an overall image provided on the grating assembly, wherein the overall image is formed from separated portions of the image applied to each individual crossbar.

As depicted in FIG. 2, the grating assembly 10 comprises a plurality of crossbars 20, a set of connector rods 40 joining the crossbars 20 together, and a frame 30 surrounding the crossbars 20 and rods 40. An overall image 3 is provided on grating assembly 10. By way of example only, the overall image 3 in FIG. 4 depicts the letter "H" but it will be understood that any desired image may be applied as the overall image 3. The overall image 3 is formed by providing portions of the image 3 on some or all of the individual crossbars. In particular, the portions of the image 3 are provided on some or all of the front surfaces and or back surfaces of the crossbars 20, as will be later described herein. FIG. 2 also shows that frame 30 comprises four frame members 30A, 30B, 30C, 30D that surround the plurality of crossbars 20 and connector rods 40. Each frame member 30A-30D further comprises an upper portion 31, a lower portion 32, and a middle portion 33.

Figure 2A:
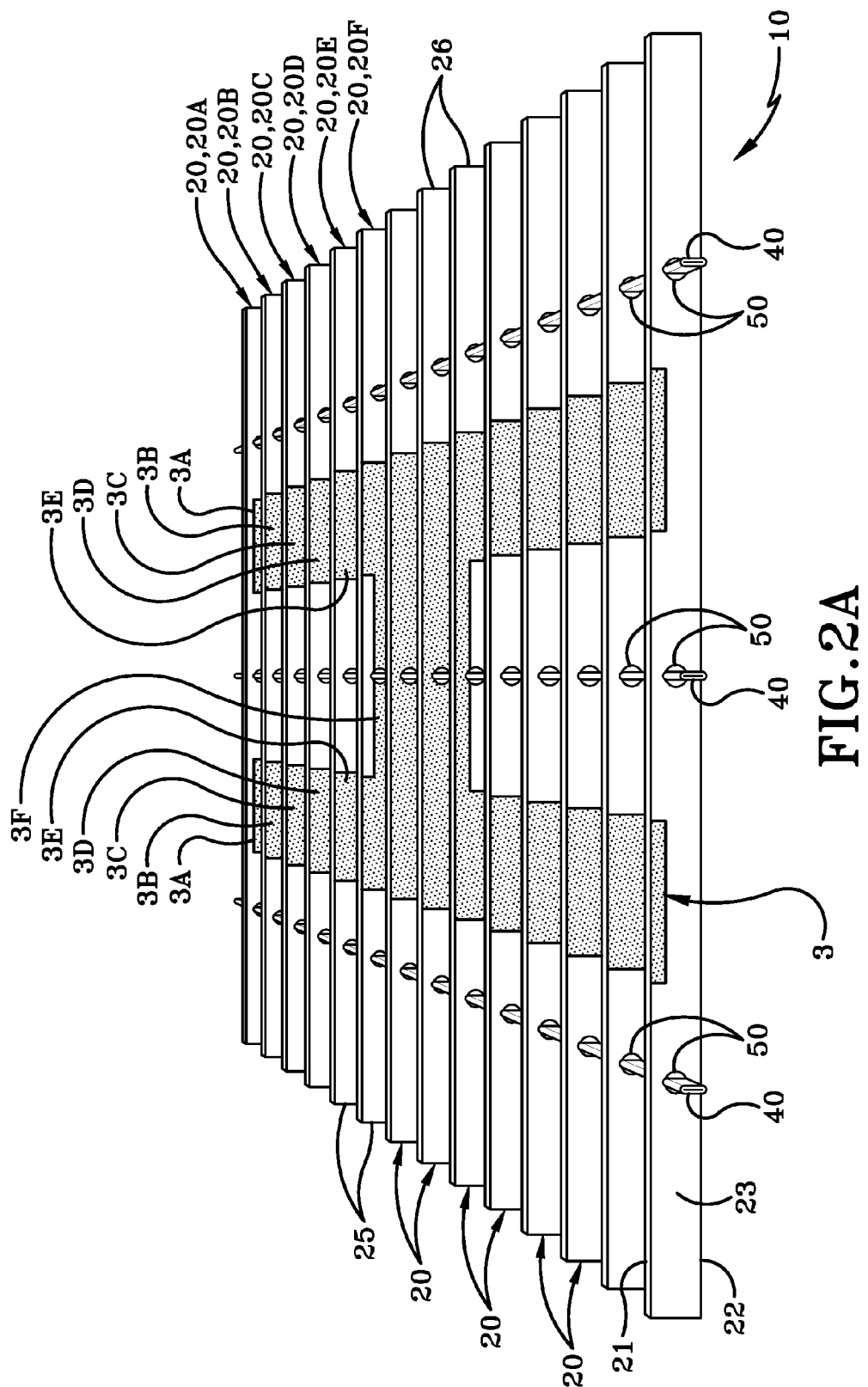
FIG. 2A is a top perspective view of a second embodiment of the grating assembly, where the grating assembly does not include a frame surrounding the crossbars and connector rods.

As depicted in FIG. 2A, a second embodiment of the grating assembly 10 comprises a plurality of crossbars 20, a set of connector rods 40, but does not include the frame 30. An overall image 3 is provided on the crossbars 20 and that image 3 is formed from portions of the images being applied to front and/or back surfaces of the individual crossbars 20. The grating assembly shown in FIG. 2A is suitable for installing in the ground as a part of a drain assembly, for example.

Figure 3:
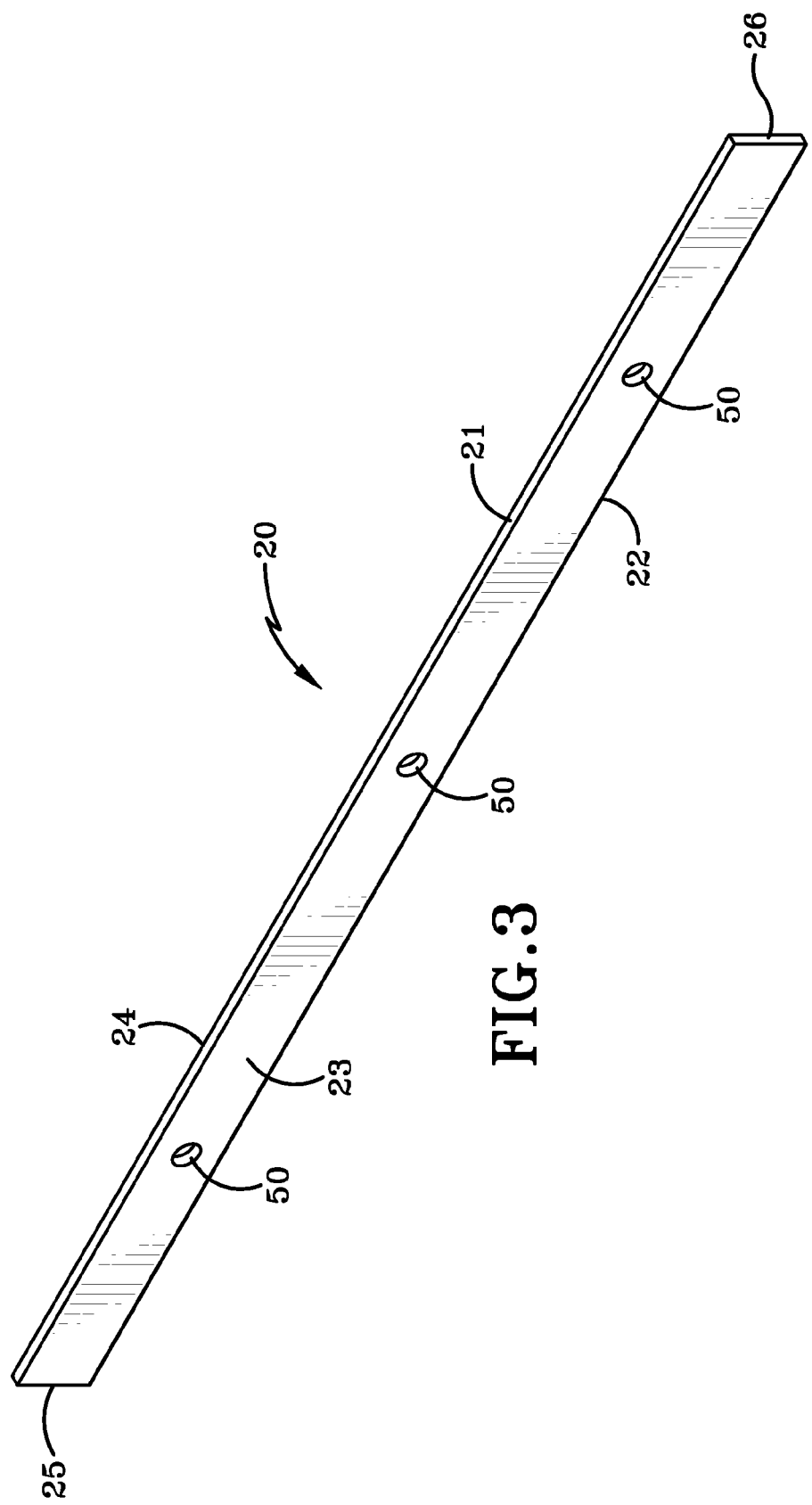
FIG. 3 is a top perspective view of a single crossbar.

FIG. 3 shows an individual crossbar 20 on its own. The crossbar 20 is an elongate, rectangularly-shaped member having an upper surface 21, a lower surface 22, a front surface 23, a back surface 24, a first side surface 25, and a second side surface 26. The crossbar 20 defines a plurality of holes 50 therein. The holes 50 extend from front surface 23 through to back surface 24. The holes 50 are spaced at intervals from each other. In particular, holes 50 may be spaced equal distances from each other.

As depicted in FIG. 2, the upper surface 21 of each crossbar 20 is recessed relative to upper portion 31 of frame members 30A-300. Furthermore, although it is not shown in FIG. 2, it will be understood that the lower surface 22 of each crossbar 20 is recessed relative to the lower portion 32 of frame members 30A-30D. First and second side surfaces 25, 26 of crossbars 20 are positioned proximate to the interior surface of middle portion 33 of frame members 30A-30D.

Figure 6A:
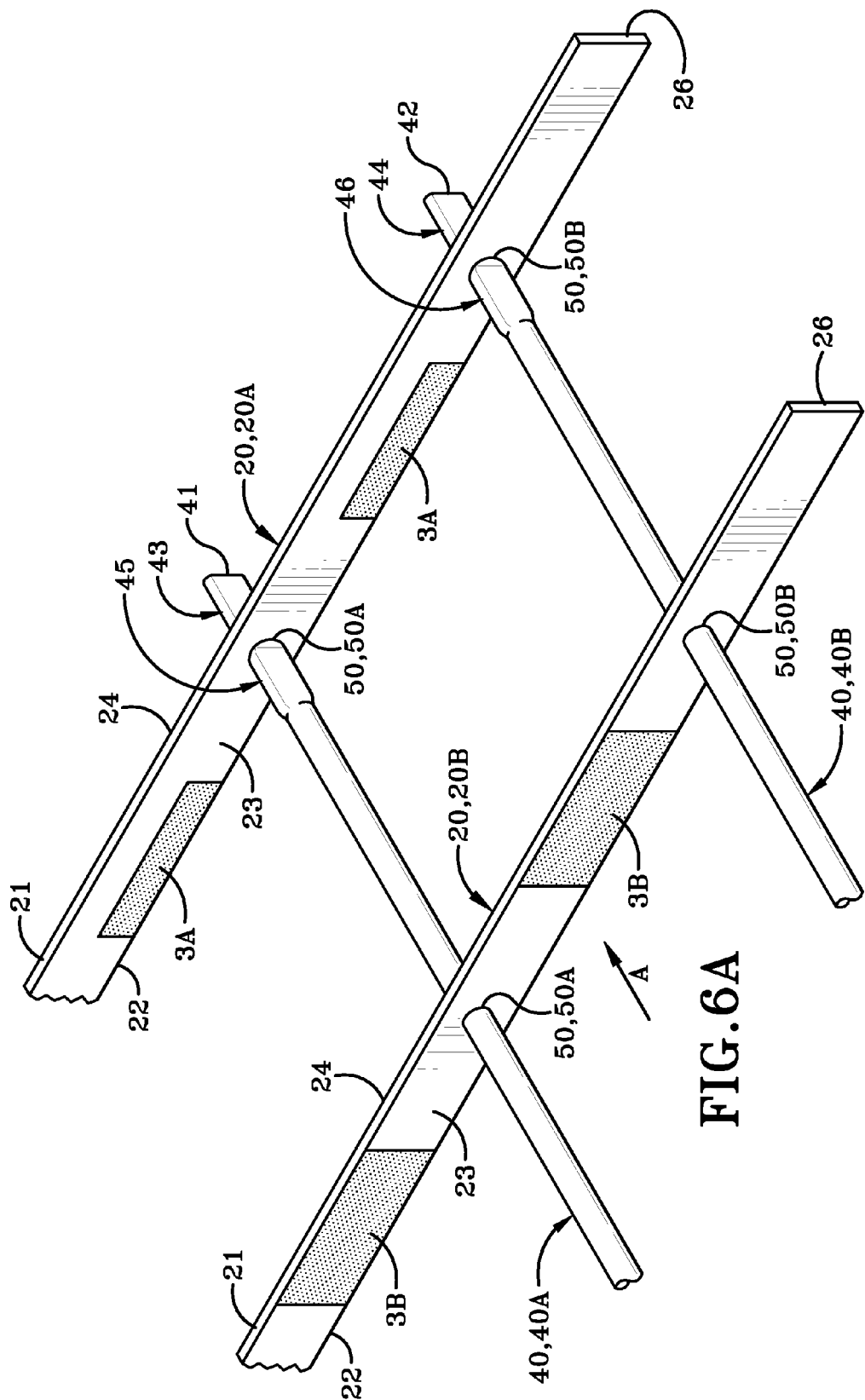
FIG. 6A is a top perspective view of a first method of joining two crossbars together using two connector rods.
Figure 6B:
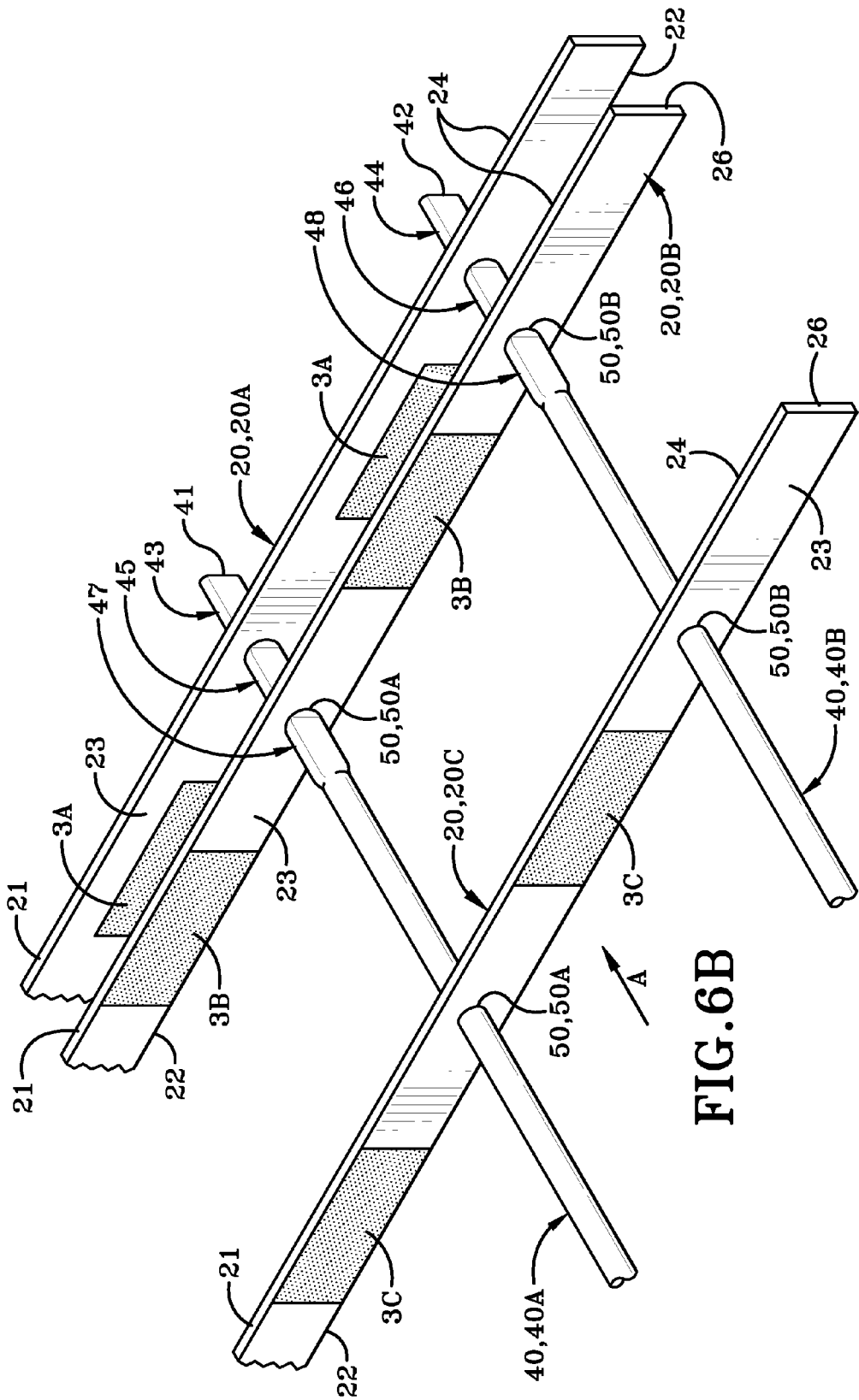
FIG. 6B is a top perspective view showing a third crossbar being added to the previously joined two crossbars using two connector rods.
Figure 6C:
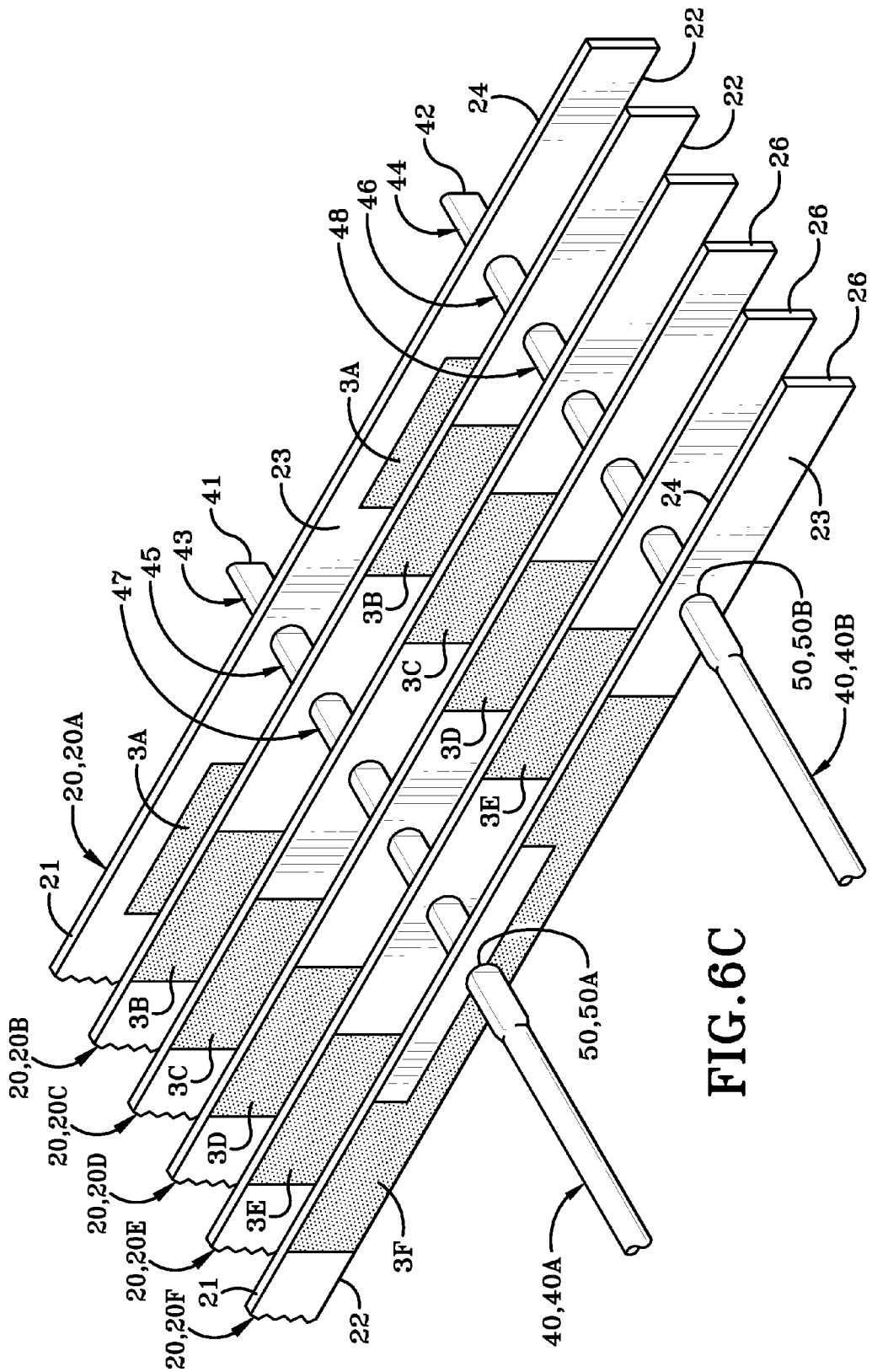
FIG. 6C is a top perspective view of a plurality of crossbars joined together using two connector rods.
Figure 7A:
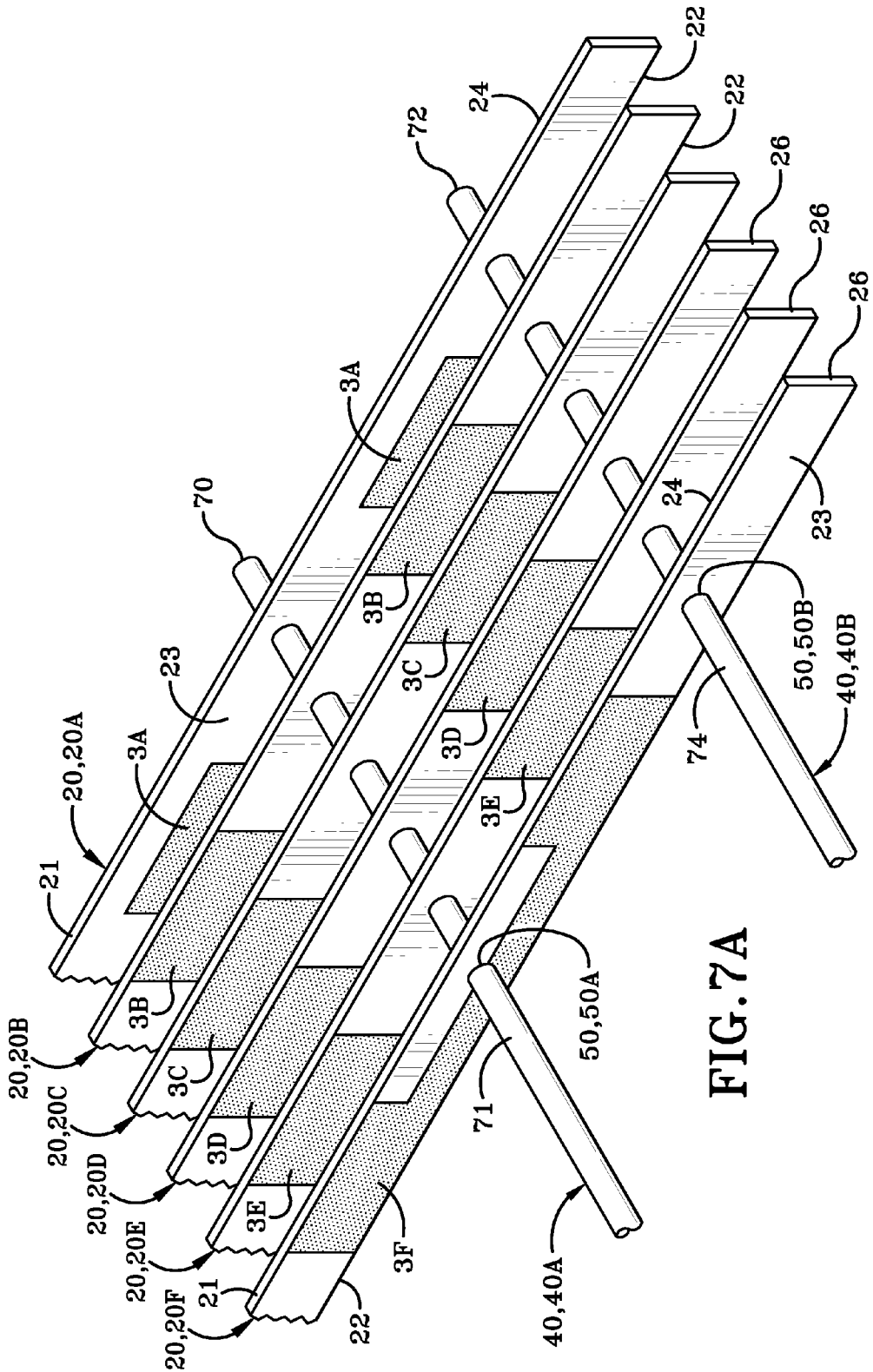
FIG. 7A is a top perspective view of a second method of connecting a plurality of crossbars together using two connector rods before providing a pinching force to the two connector rods.
Figure 7B:
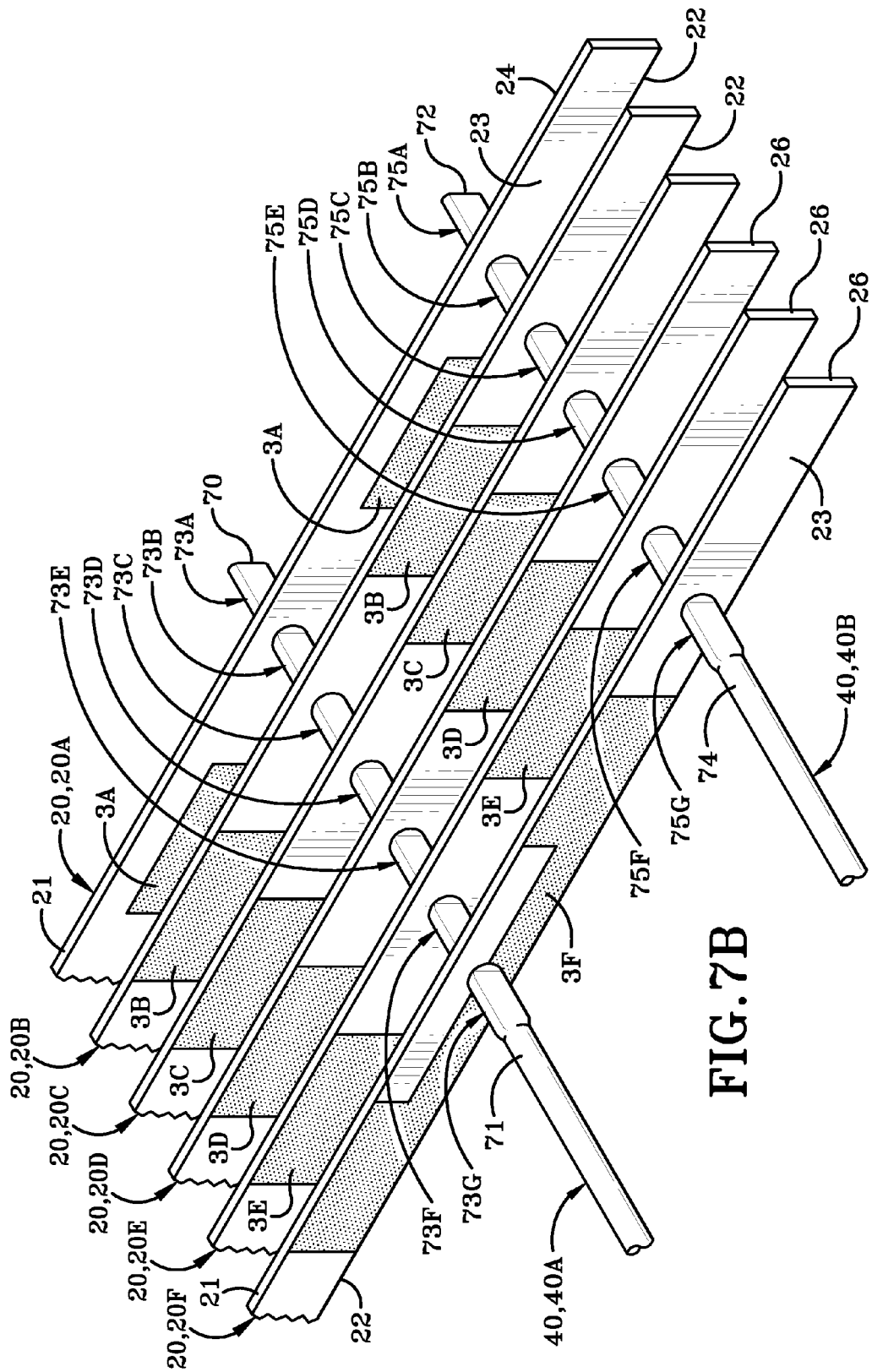
FIG. 7B is a top perspective view of the second method of connecting the plurality of crossbars together using two connector rods after providing the pinching force to the connector rods.
Figure 8A:
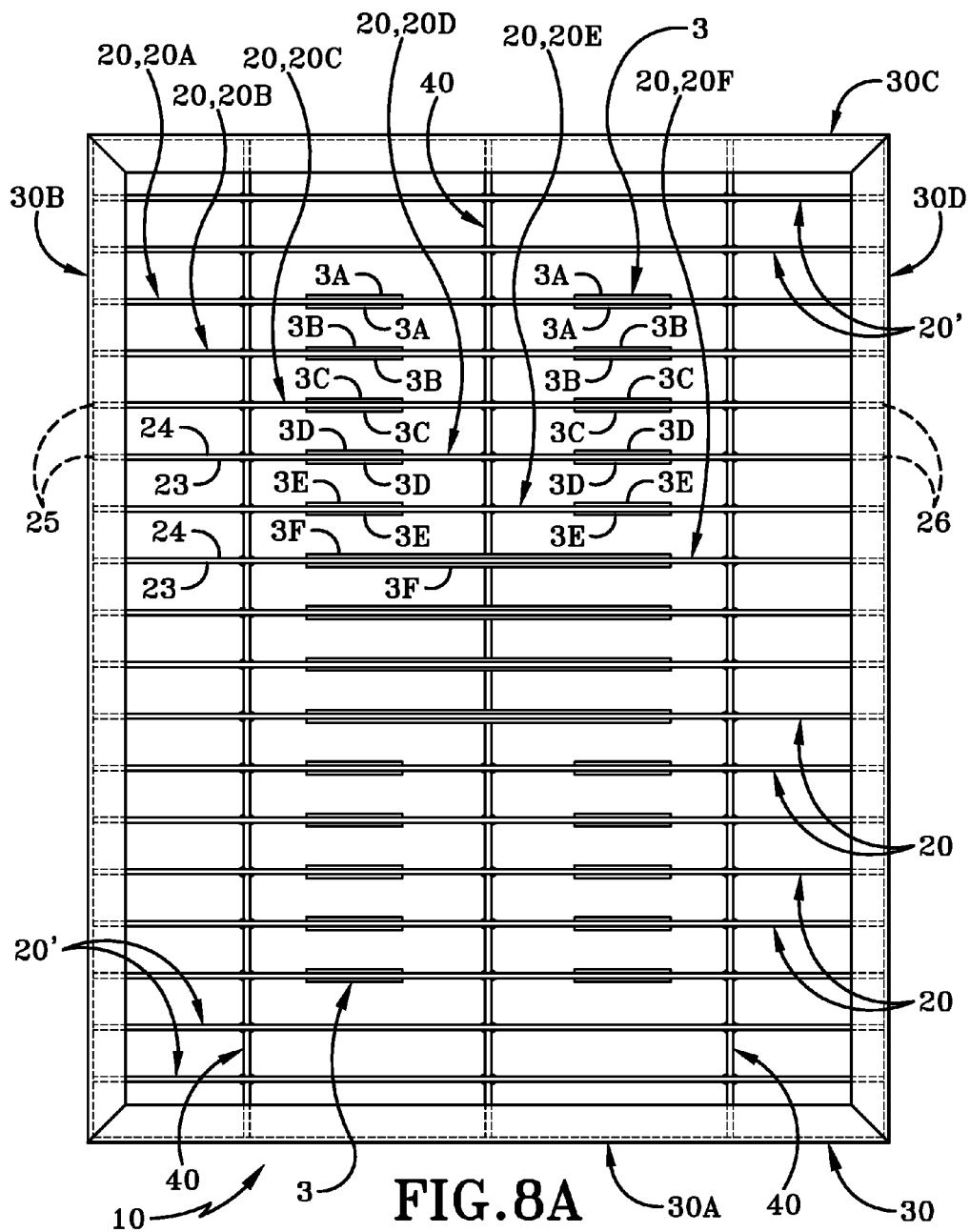
FIG. 8A is a top plan view of a grating assembly showing the portions of the overall image being provided on each of the front and back surfaces of the individual crossbars.

As shown in FIGS. 2, 4, 6A-6C, 7A-7B, 8 and 8A, the overall image 3 provided on grating assembly 10 comprises a plurality of image sections 3A, 3B, 3C, 3D, 3E, 3F that are provided on individual crossbars 20. As depicted in FIG. 8, in one embodiment, the image 3 is formed by images sections 3A-3F that are provided on the front surfaces 23 of crossbars 20 of the grating assembly 10. It will be understood that the image sections 3A-3F may, alternatively, be provided on the back surfaces 24 of the crossbars 20.

FIG. 8A shows that in another embodiment, the image 3 may be provided by providing image sections 3A-3F on the front surfaces 23 and back surfaces 24 of the crossbars 20. It will be understood that not all of the crossbars 20 in the grating assembly 10 may have image sections applied thereto. For example, some of the crossbars 20' may be free of image sections. If image sections 3A-3F are provided on only the front surfaces 23 (or the back surfaces 24) of the crossbars 20, then the overall image 3 will only be visible when the grating assembly is approached from a direction where the front surfaces 23 (or the back surfaces 24) are visible. If image sections 3A-3F are provided on the front surfaces 23 and the back surfaces 24, then the overall image 3 will be visible when the grating assembly 10 is approached from any direction where the front surfaces 23 and/or the back surfaces 24 are visible.

FIGS. 5A to 5E show various methods for providing the image sections 3A-3F to the plurality of crossbars 20 that will eventually be used to fabricate grate assembly 10. FIG. 5A shows the image 3 being applied to the crossbars 20 by painting image sections 3A-3F on front surface 23 or back surface 24 of the plurality of crossbars 20. The crossbars 20 are placed with their back surfaces 24 on a flat surface such that the front surfaces 23 of the crossbars 20 face upwardly. Paint 61 may be applied to front surfaces 23 using a CNC painting machine 60, or any other suitable piece of equipment. In particular, The paint 61 is applied to a first, second, third, fourth, fifth, sixth crossbar 20A, 20B, 20C, 20D, 20E, 20F in a specific pattern so as to form section image 3A-3F. Each individual crossbar 20A, 20B, 20C, 20D, 20E, 20F thus has only part of the overall image 3 painted thereon. FIG. 5A, shows crossbars 20 separated from each other by gaps and it will be understood that the machine 60 will stop painting each time it senses a gap between the crossbars 20.

FIGS. 5B and 5C show the image 3 being painted onto crossbars 20 when the crossbars 20 are positioned so that they butt up against each other and there are no gaps between adjacent crossbars 20. The image 3 may be continuously sprayed or painted onto crossbars 20 without pausing between adjacent crossbars 20 because there are no spaces between adjacent crossbars 20. In this embodiment, the crossbars 20 are initially aligned to abut each other before providing the paint 61 on the top surfaces 23 of each crossbar 20. As depicted in FIG. 5C, the crossbars 20 are then separated and it may be seen that each individual crossbar 20A, 20B, 20C, 20D, 20E, 20F has its corresponding image section 3A, 3B, 3C, 3D, 3E, 3F thereon. Any of the crossbars 20 may include one or more image section thereon. For example, as may be seen in FIG. 4, one crossbar 20A has two image sections 3A thereon. Other crossbars such as 20F may have only one image section thereon. Yet other crossbars may have no image sections thereon.

After providing the paint 61 on the crossbars 20 by either method shown in FIG. 5A or FIGS. 5B and 5C, an optional protective coating 4 may be applied over the top of the image sections 3A-3F. This coating may be a clear coat or may be colored or may be of a type suitable to protect the image 3 from ultra violet (UV) light.

In another method, image 3 may be provided on grating assembly 10 by applying a decal to the crossbars 20. As depicted in FIG. 5D, the plurality of crossbars 20 may be butted up against each other so that there are no gaps between adjacent crossbars 20. A sheet material 63 that includes the image 3 thereon may be placed over the plurality of crossbars 20 and a roller 62 may be used to press the sheet material 63 onto front surfaces 23 of crossbars 20. The sheet material 63 may include an adhesive to bond it to crossbars 20. Alternatively, the roller 62 may be heated so as to heat weld sheet material 63 to the crossbars 20 or the crossbars 20 may be heated to heat weld sheet material 63 thereto. As depicted in FIG. 5E, after the sheet material 63 is applied to the crossbars 20, a cutter 64 may be used to slice through those regions of the sheet material 63 that extends across the small gaps between the adjacent crossbars 20. In this way where the sheet material 63 is separated in image sections 3A-3F on individual crossbars 20A-20F. The cutter 64 may be a mechanical knife or a laser.

It will further be understood that the image sections 3A-3F may be provided on any of the top surface 21, bottom surface 22, front surface 23, back surface 24, first side surface 25 and/or second side surface 26 of the crossbars 20. The method of providing the image sections may be any suitable method such as those described above but could also include printing the image sections, embossing the image sections, stamping the image sections, 3D printing of the image therein, hand painting, chemical etching or even embedding colors or objects within the crossbars (particularly ones fabricated from fiberglass) to form the image sections. It should be understood that any suitable method of providing an image section one or more of the surfaces of the crossbars is contemplated to be usable in the present invention.

FIG. 6A shows the first crossbar 20A containing two first image sections 3A thereon. A first connector rod 40A is then inserted through a first hole 50A of the first crossbar 20A. After the first connector rod 40A passes through the first hole 50A of the first crossbar 20A, a pinching force is applied to a first end 41 of connector rod 40A thereby forming a first bump 43 so that the first connector rod 40A is joined to the first crossbar 20A. A pinching force is then applied to that part of first connector rod 40A that is located next to the front surface 23. This creates a second bump 45 in the connector rod 40A. The first crossbar 20A is now securely locked between the first bump 43 and the second bump 45 of the first connector rod 40A. Then, a second connector rod 40B is inserted through a second hole 50B of the first crossbar 20A. After the second connector rod 40B passes through the second hole 50B of the first crossbar 20A, a first end 42 of the second connector rod 40B that extends beyond the back surface 24 is pinched to form a first bump 44 and a portion of the second connector rod 40B that is located next to the front surface 23 is pinched to form a second bump 46. The first crossbar 20A is now securely locked between the first bump 44 and the second bump 46 of the second connector rod 40B.

Then, the second crossbar 20B is provided. The second crossbar 20B has two image sections 3B thereon. The holes 50A, 50B on the second crossbar 20B are aligned with the first connector rod 40A and the second connector rod 40B. The second crossbar 20B is pushed in the direction indicated by arrow "A" into position near the first crossbar 20A so that the first crossbar 20A and the second crossbar 20B are separated from each other by second bumps 45, 46. A pinching force is applied to that part of each of the first and second connector rods 40A, 40B that is adjacent the front surface 23 of the second crossbar 20B to form third bumps 47, 48 (shown in FIG. 6B). This locks the second crossbar 20B to first and second connector rods 40A, 40B and to the first crossbar 20A. As depicted in FIG. 6C, this process is repeated until a plurality of crossbars 20A-20F is connected to each other by the first and second connector rods 40A, 40B. It should be noted that each individual crossbar, such as crossbars 20C, 20D, 20E, and 20F each include one or more image sections 3C, 3D, 3E or 3F thereon. This process continues until a last crossbar is engaged with the first connector rod 40A and the second connector rod 40B. The process described above is used to connect any number of crossbars 20 to any number of connector rods 40.

Alternatively, in another embodiment, as depicted in FIG. 7A, all crossbars 20 are provided and placed simultaneously on the same plane. Each crossbar 20 includes one or more image sections thereon. So, for example, the first crossbar 20A includes two image sections 3A thereon and the sixth crossbar 20F includes one image section 3F thereon. The crossbars 20 are positioned so that the holes 50A, 50B are aligned with each other. Then, the first and second connector rods 40A, 40B are inserted through the aligned first and second holes 50A, 50B of the crossbars 20. Then, a first end 70 and a second end 71 of the first connector rod 40A and all portions between adjacent crossbars 20 are deformed by applying a pinching force to create a series of bumps 73A, 73B, 73C, 73D, 73E, 73F, 73G (shown in FIG. 7B) on first connector rod 40A. The application of the pinching force can occur sequentially or simultaneously. Similarly, the first end 72 and the second end 74 of the second connector rod 40B and all portions between adjacent crossbars 20 are deformed by applying a pinching force to create a series of bumps 75A, 75B, 75C, 75D, 75E, 75F, 75G on the second connector rod 40B. The crossbars 20 are now securely locked with the connector rods 40 by the series of the bumps 73A-73G and 75A-75G. It will be understood that the first and second connector rods 40A, 40B may be deformed sequentially or simultaneously.

If there is a third hole in the crossbars 20, then a third connector rod may be introduced and inserted therein for the same purpose and procedure to secure the crossbars 20 with the additional connector rod 40 together. The crossbars 20 may be equally spaced apart.

FIG. 8 shows the grating assembly 10 in which the various image sections 3A-3G are all applied to the front surfaces 23 of all the crossbars 20. FIG. 8A shows the grating assembly 10 in which the various image sections 3A-3G are applied to each of the front surfaces 23 and back surfaces 24 of the all of the crossbars 20. Grating assembly 10 is illustrated as being manufactured in the manner depicted in FIGS. 7A and 7B but it will be understood that the method shown in FIGS. 6A-6C may be used to form grating assembly 10.

As depicted in FIG. 9, after assembling the crossbars 20 with the connector rods 40, the frame 30 is fixedly attached around the edges of the crossbars 20 and the connector rods 40. FIG. 9 also shows the bump 73C that is formed to secure the crossbar 20B with the second connector rod 40B. It may be seen that the bump 73C is larger than the diameter of the second hole 50B and therefore the second connector rod 40B cannot be withdrawn from its engagement with second crossbar 20B. FIG. 9 also shows one of the image sections 3B that is provided on second crossbar 20B by any of the previously described methods. Forming the bumps 73 enables the crossbars 20 be to connected together by a method other than welding and consequently the image section 3B thereon is not damaged during fabrication of the grating assembly 10.

Figure 10A:
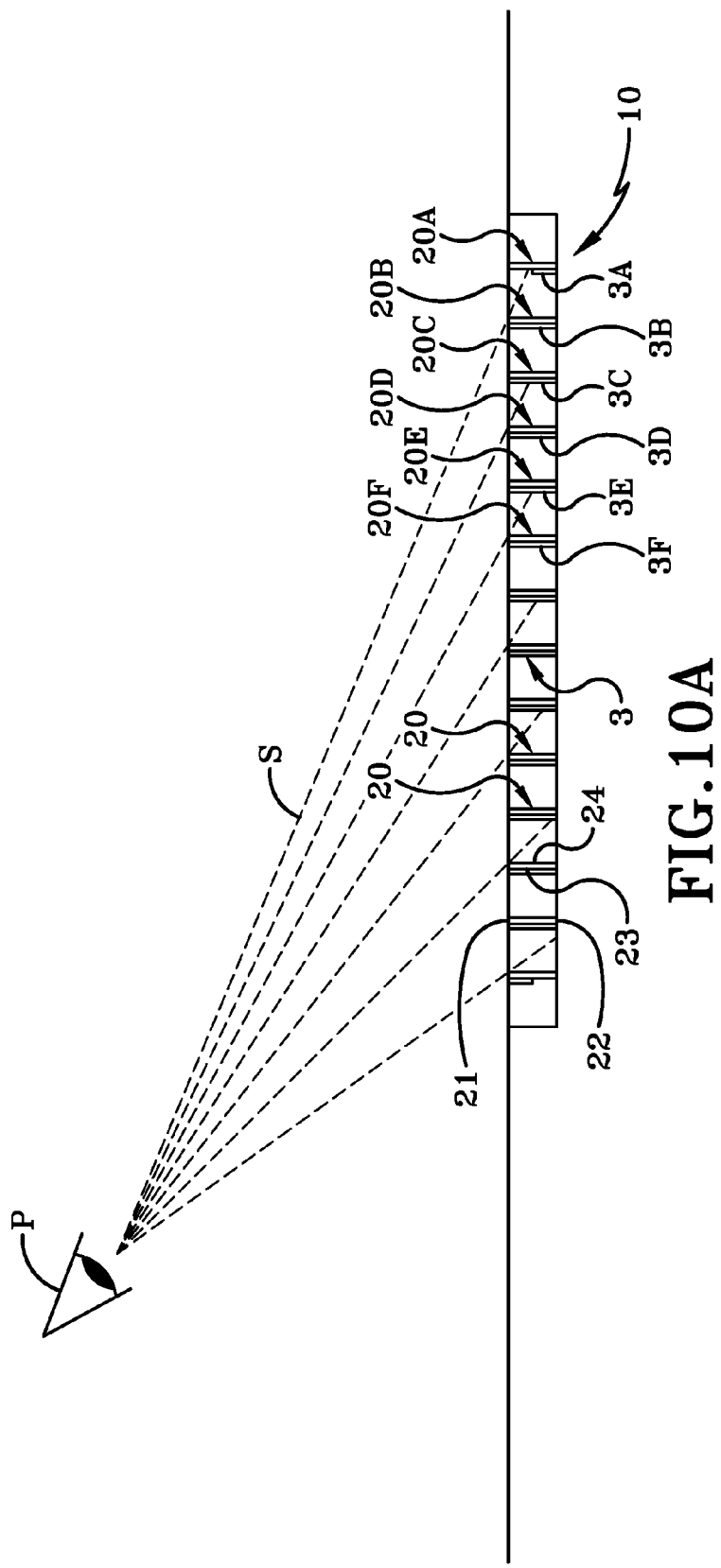
FIG. 10A is a side elevation view showing a first line of sight to the grating assembly.

In operation, as depicted in FIG. 10A, if a user is sufficiently far away from the grating assembly 10, then the user may be able to clearly appreciate the overall image 3 because the user is able to see all of the image sections 3A-3F on the front surfaces 23 of the various crossbars 20. In particular, the user can see most or all of the crossbars' front surfaces 23 from proximate the top surface 21 through to the bottom surface 22. It should be noted that the image 3 on grating assembly 10 may appear compressed in height when viewed from a distance away.

Figure 10B:
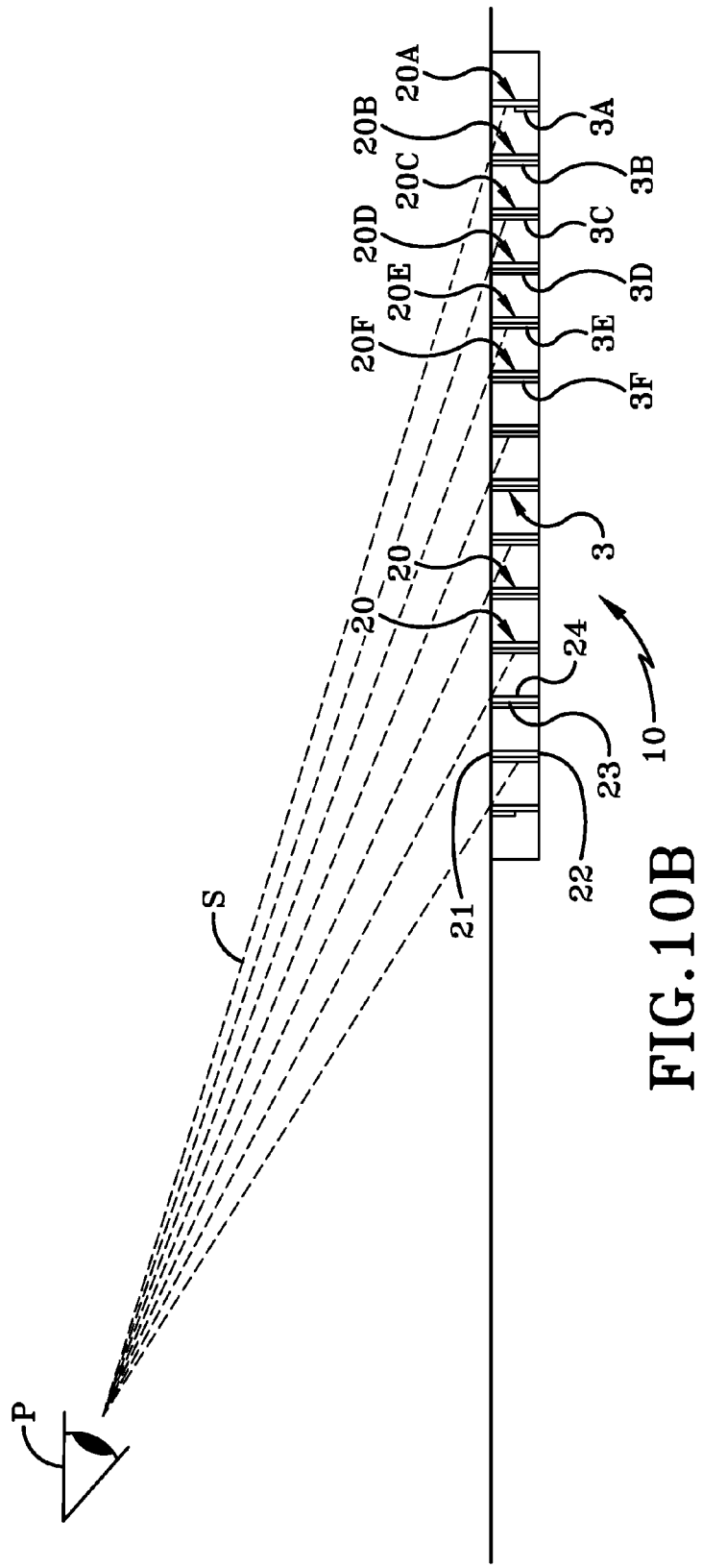
FIG. 10B is a side elevation view showing a second line of sight to the grating assembly.

On the contrary, as depicted in FIG. 10B, if a user is only close enough to the grating assembly 10, to see part of the front surfaces 23 of the various crossbars (i.e., not all the way from the top surface 21 to the bottom surface 22) then the user may only see part of the image 3. If the user is not close enough to the grating assembly 10, interference by each adjacent crossbar can prevent the user from seeing the top surface 21 or the bottom surface 22 at the same time. If the user cannot see the top surface 21 and the bottom surface 22 of the crossbar 20 simultaneously, he may see the image as discontinued, thus it may look incomplete. On the contrary, if the user is close enough to the grating assembly 10 as shown in FIG. 10A, interference by each adjacent crossbar is not severe so that the user is able to see the top surface 21 and the bottom surface 22 of the crossbar 20 at the same time and therefore the image is complete.

Figure 10C:
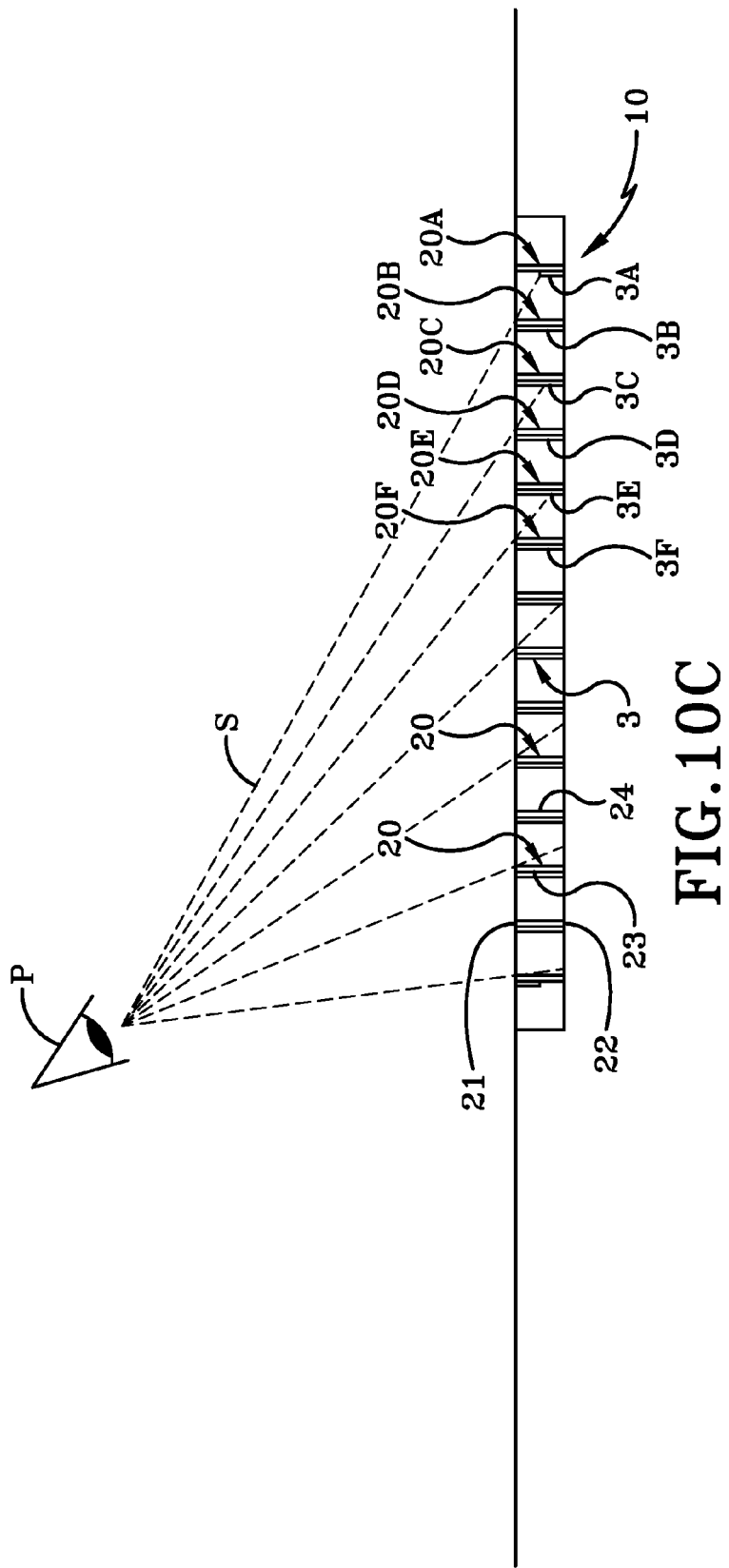
FIG. 10C is a side elevation view showing a third line of sight to the grating assembly.

Furthermore, if the distance from the viewer to the grating assembly 10 is too close (as shown in FIG. 10C) then the image 3 is not readily seen as the front surfaces 23 of various crossbars 20 cannot be seen at all and the image is therefore severely incomplete.

Figure 11:
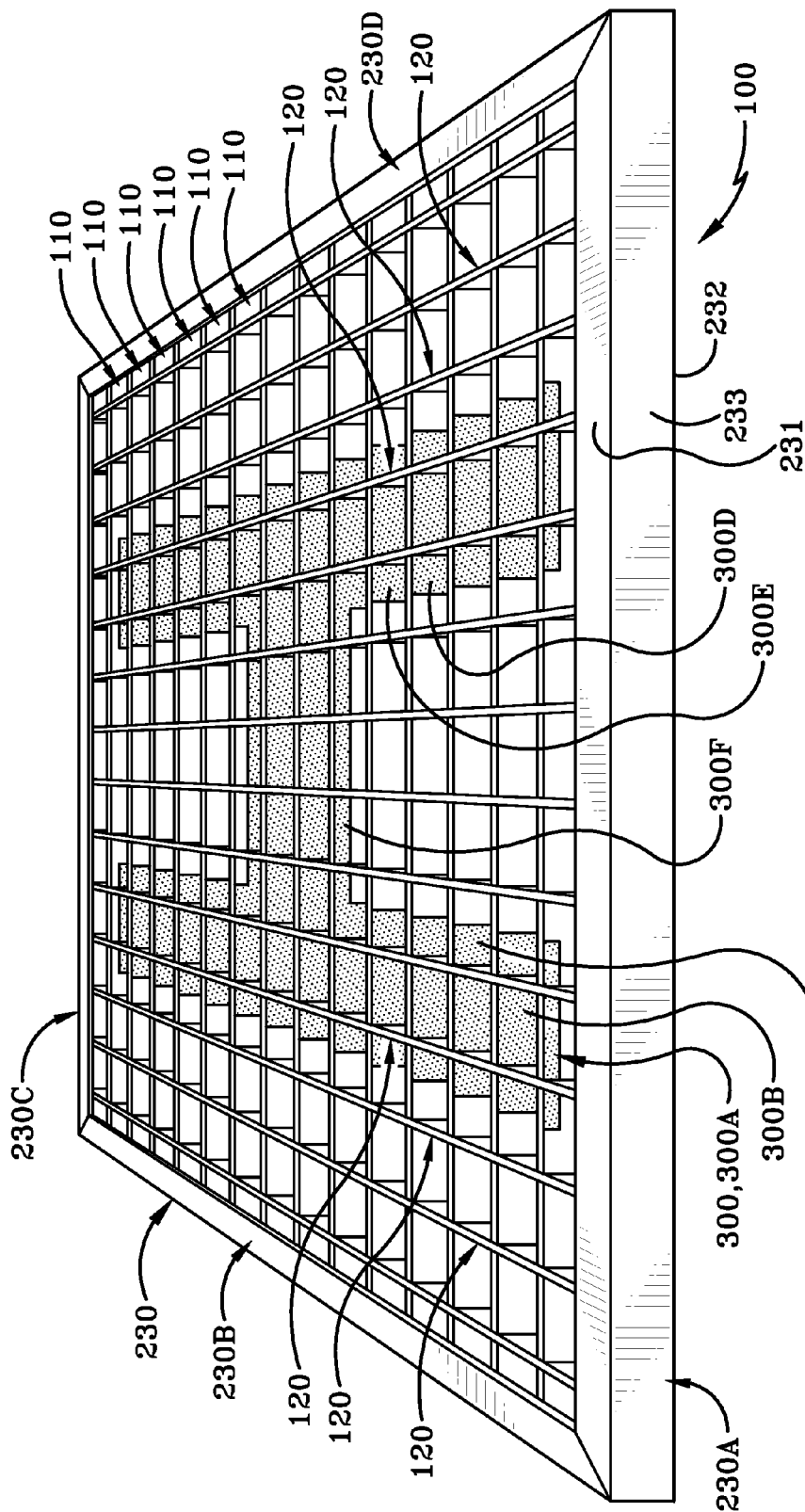
FIG. 11 is a top perspective view of a third embodiment of a grating assembly in accordance with an aspect of the present invention; wherein the grating assembly is fabricated by interlocking crossbars together.
Figure 12:
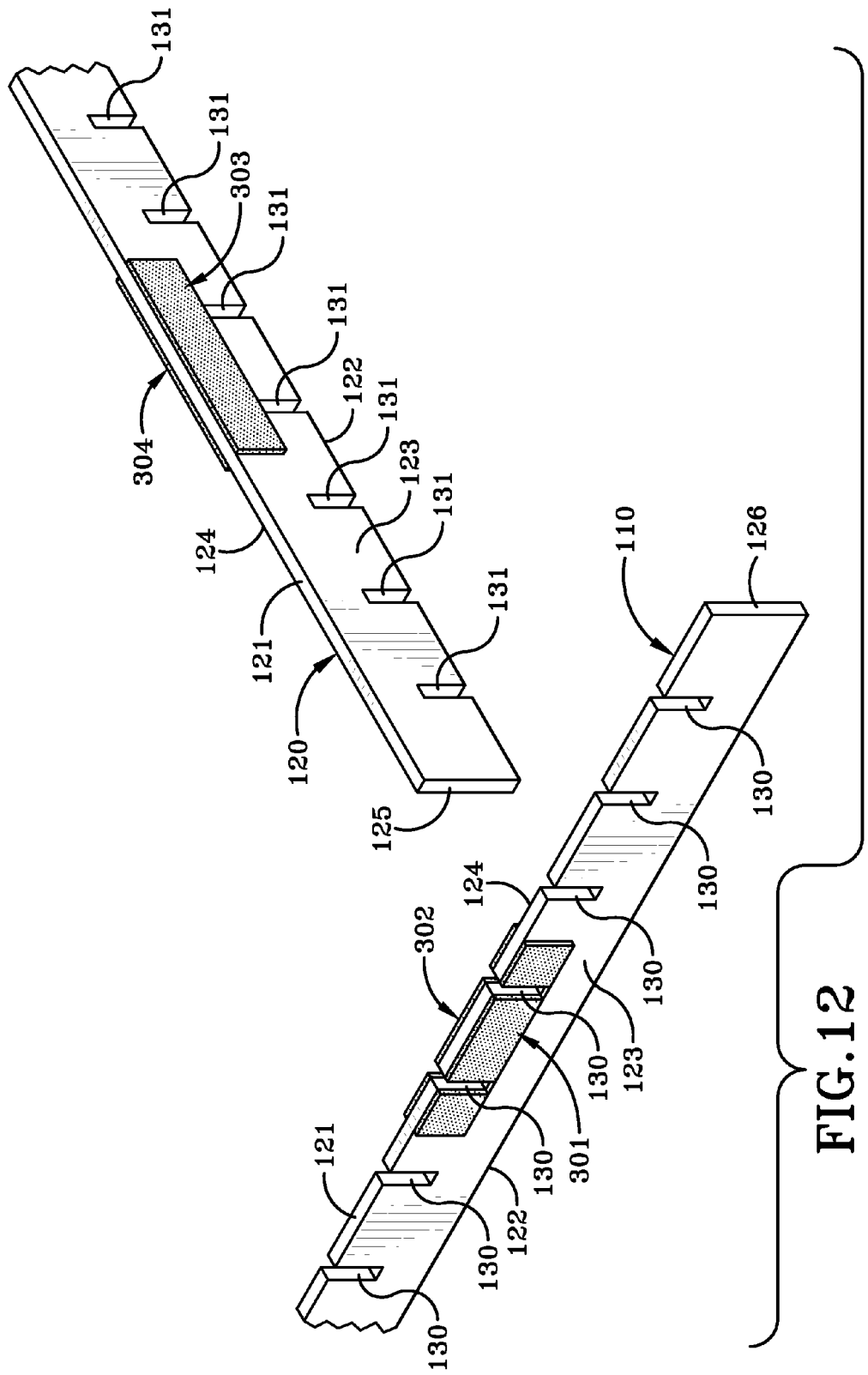
FIG. 12 is a partial top perspective view of individual transversal and longitudinal crossbars that are used to make the grating assembly of FIG. 11.

In the third embodiment, depicted in FIG. 11, the grating assembly 100 comprises a plurality of transversal and longitudinal crossbars 110, 120 that are interlocked with each other. Grating assembly 100 may include a frame 230 and is provided with an image 300 thereon. The frame 230 includes a first frame member 230A, second frame member 230B, third frame member 230C, and fourth frame member 230D. FIG. 12 shows that each transverse crossbar 110 and each longitudinal crossbar 120 is an elongate generally rectangular member that has a top surface 121, a bottom surface 122, a front surface 123, and a back surface 124. The crossbar 110 is shown as including a second side 126 and crossbar 120 is shown as including a first side 125. Although not illustrated, it will be understood that crossbar 110 also includes a first side surface and crossbar 120 also includes a second side.

Both of the crossbars 110 and 120 define a plurality of U-shaped notches 130, 131, respectively, therein that extend from the front surface 123 through to the back surface 124. In the transverse crossbar 110, the notches 130 originate in the top surface 121 and extend downwardly for a distance towards the bottom surface 122. The longitudinal crossbar 120 has notches 131 that originate in the bottom surface 122 and extend upwardly for a distance towards the top surface 121. Notches 130, 131 are complementary in size and shape and allow the transversal and longitudinal crossbars 110, 120 to be interlocked with each other.

In one instance, as seen in the FIG. 12, numbers of the notches 130 on the transverse crossbar 110 may be equal to numbers of notches on the longitudinal crossbars 120. In another instance, numbers of the notches 130 on the transverse crossbar 110 may not be equal to numbers of notches on the longitudinal crossbars 120.

As depicted in FIG. 12, the front surface 123 and/or back surface 124 of the transversal and longitudinal crossbars 110, 120 have image sections 301, 302, 303, and 304 that are similar to image sections 3A-3F provided thereon in any suitable method, such as the methods previously described herein. As illustrated in FIG. 12, four different images may be simultaneously provided on the grating assembly 100 that is made up from the traversal and longitudinal crossbars 110, 120. The images may be the same or may be different depending on which of the front surfaces 123 or back surfaces 124 of the traversal and longitudinal crossbars 110, 120. For example, as shown in FIG. 12, one or more first image sections 301 may be provided on the front surface 123 of the transverse crossbar 110. One or more second image sections 302 may be provided on the back surface 124 of the transverse crossbar 110. One or more third image sections 303 may be provided on the front surface 123 of the longitudinal crossbar 120. One or more fourth image sections 304 may be provided on the back surface 124 of the longitudinal crossbar 120. The image sections of the plurality of crossbars 110, 120 will together make up the images that may be seen by a person approaching the grating assembly as shown in FIG. 1.

Figure 13A:
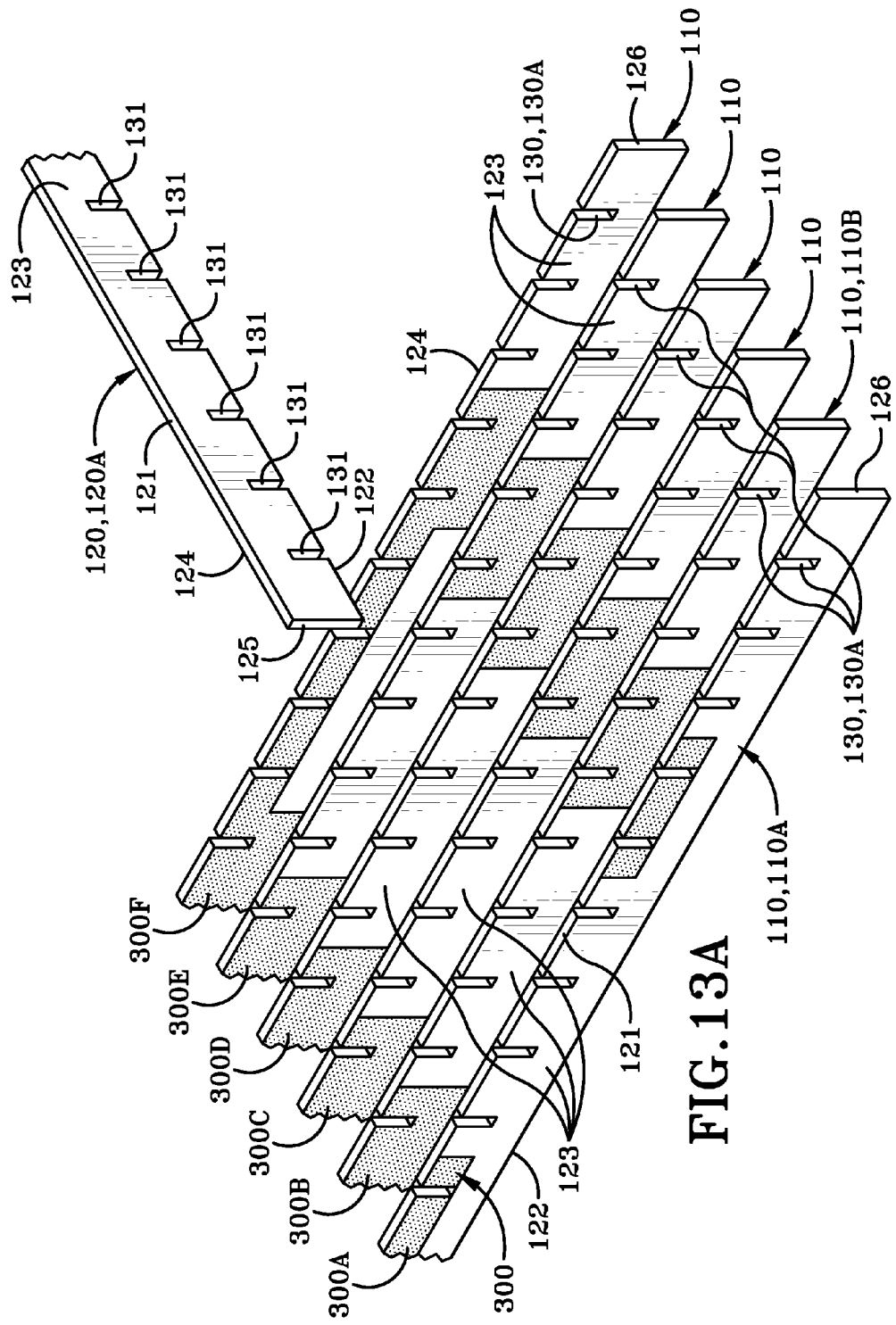
FIG. 13A is a partial front perspective view of a method of fabricating the grating assembly of FIG. 11 showing a longitudinal crossbar being positioned to engage with a plurality of transverse crossbars.

As depicted in FIG. 13A, the plurality of transverse crossbars 110 containing the image sections 300A, 300B, 300C, 300D, 300E, 300F on the front surfaces 123 are provided. The ends of the crossbars 110 are aligned with each other and adjacent crossbars, such as crossbar 110A and 110B are spaced a distance apart from each other. The various notches 130 on the plurality of transverse crossbars 110 are aligned with each other. For instance, a first notch 130A in a first transverse crossbar 110A is aligned with a first notch 130A in a second transverse crossbar 110B. Furthermore, the notches 130 on the transverse crossbars 120 face upwardly. Then, a first longitudinal crossbar 120A is brought over the plurality of first notches 130A of the transverse crossbars 110. The notches 131 of the first longitudinal crossbar 120A face downwardly so that the notches 131 of the first longitudinal crossbar 120 may be perpendicularly interlocked with the first notches 130A of the transverse crossbar 110. Particularly, interlocking the first notches 130A on the transverse crossbar 110 with the notches 131 of the first longitudinal crossbar 120A secures the first longitudinal crossbar 120A to the plurality of transverse crossbars 110.

Figure 13B:
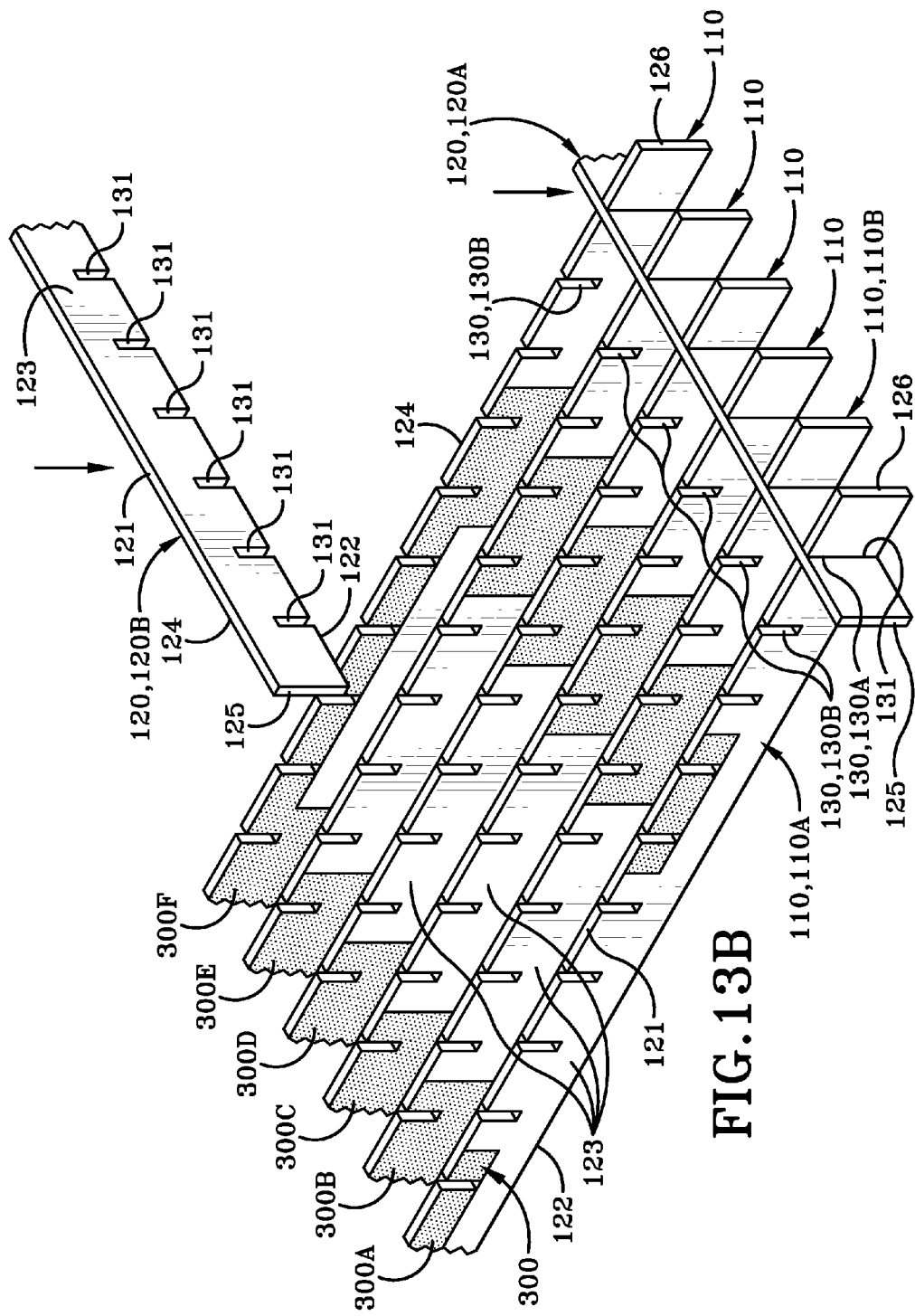
FIG. 13B is a partial front perspective view showing a second longitudinal crossbar being positioned to engage with the plurality of transverse crossbars.

Similarly, as shown in FIG. 13B, a second longitudinal crossbar 120B is brought over a plurality of second notches 130B of the transverse crossbars 110. The second longitudinal crossbar 120B is perpendicularly interlocked with the second notches 130B of the transverse crossbars 110 in the same manner as described above. The same method continues until the last longitudinal crossbar 120 is connected with the plurality of transverse crossbars 110. A grating assembly 400 of the interlocked transverse crossbars 110 and the longitudinal crossbars 120 is shown in FIG. 13C.

Figure 13C:
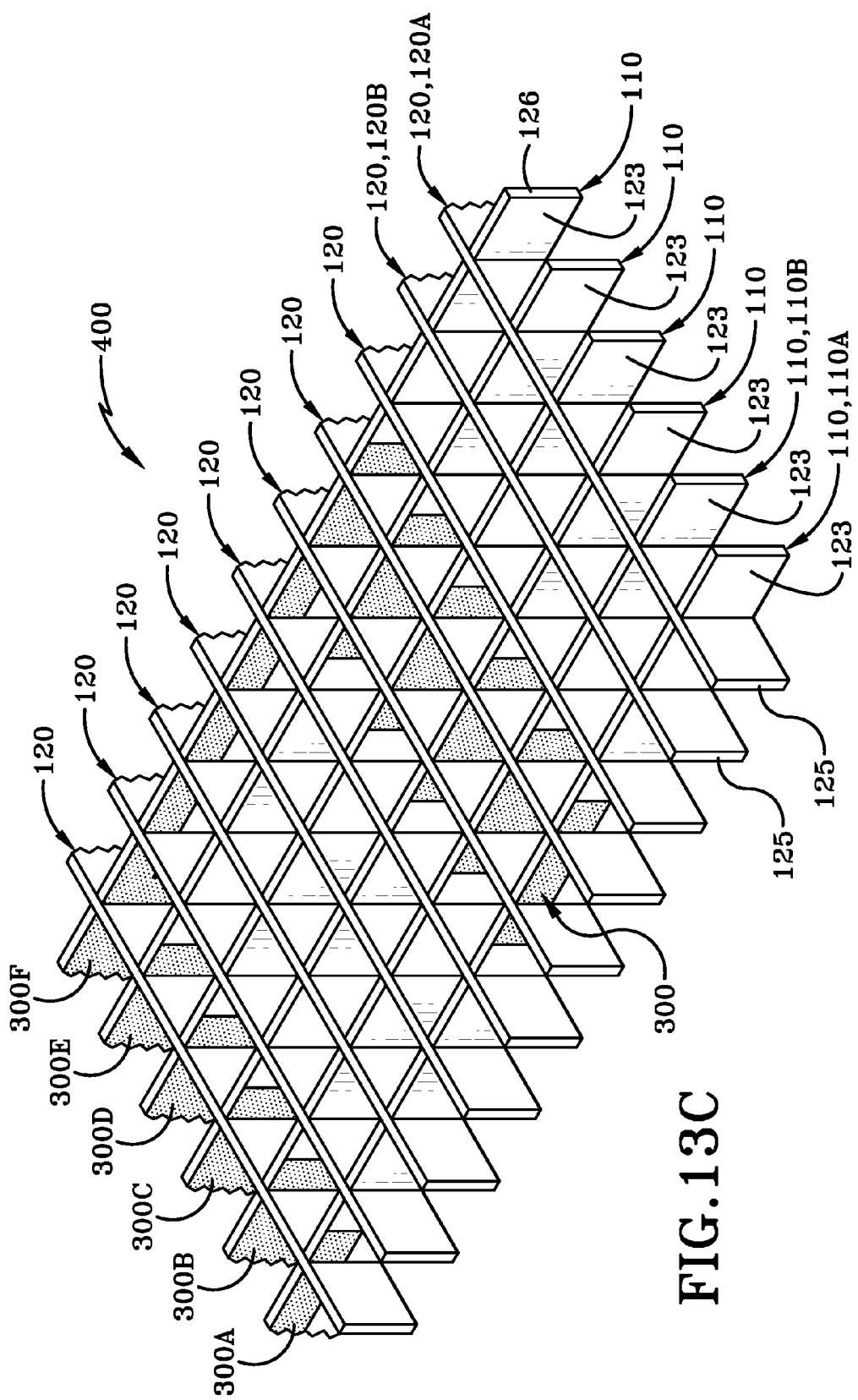
FIG. 13C is a partial front perspective view of a plurality of longitudinal crossbars being positioned to engage with the plurality of transverse crossbars.

FIGS. 13A-13C show that the transverse crossbars 110 have a plurality of images sections 300A, 300B, 300C, 300D, 300E, 300F provided thereon, particularly on the front surfaces 123. These images sections together form an overall image that may be seen by a person approaching the grating assembly 400. Assembling the grating assembly 400 as described above ensures that the overall image formed by the image sections 300A-300F is not damaged during fabrication of the grating assembly.

Figure 14:
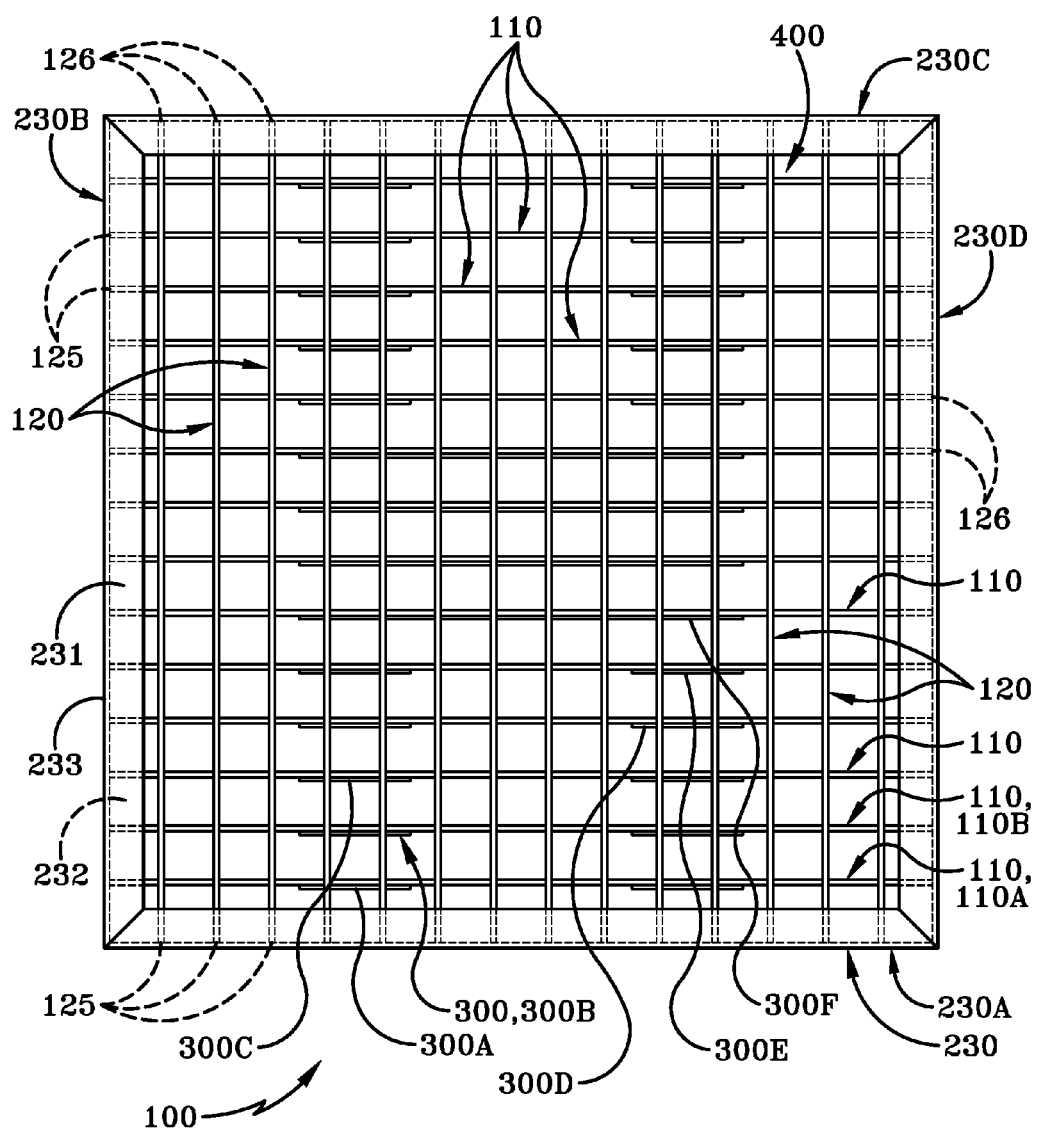
FIG. 14 is a top plan view of the grating assembly shown in FIG. 11 showing portions of the overall image applied to front surfaces of the individual transverse crossbars.

As depicted in FIG. 14, the frame members 230A-230D are fixedly attached around the edges of the grating assembly 400 formed by engaging the transverse crossbars 110 and the longitudinal crossbars 120 together as described above. Each frame member 230A-230D further comprises an upper portion 231, a lower portion 232, and a middle portion 233. The upper surface 121 of the transversal or longitudinal crossbar 110, 120 is recessed relative to the upper portion 231 of the frame members 230A-230D. Furthermore, although it is not shown in FIG. 14, it will be understood that the lower surface 122 of the transversal or longitudinal crossbar 110, 120 is recessed relative to the lower portion 232 of the frame members 230A-230D. First and second side surfaces 125, 126 of the transversal or longitudinal crossbar 110, 120 are positioned proximate to the interior surface of the middle portion 233 of the frame members 230A-230D.

A method of manufacturing a decorative grating 10 may comprise the steps of providing a first crossbar 20A and a second crossbar 20B, placing the first and second crossbars 20A, 20B a spaced distance from each other, and providing one or more image sections 3A, 3B on one or both of the first and second crossbars 20A, 20B, wherein the one or more image sections 3A, 3B together form an image 3 that is visible to a person P (FIG. 1) a distance away from the first and second crossbars 20A, 20B. Each of the first crossbar 20A and the second crossbar 20B has a front surface 23 and an opposed back surface 24 and the one or more image sections 3A, 3B are provided on one or both of the front surface 23 and the back surface 24.

A method of manufacturing a decorative grating 10 may comprise the steps of providing a first crossbar 20A and a second crossbar 20B, placing the first and second crossbars 20A, 20B at an angle relative to each other, and providing one or more image sections 3A, 3B on one or both of the first and second crossbars 20A, 20B, wherein the one or more image sections 3A, 3B together form an image 3 that is visible to a person (FIG. 1) a distance away from the first and second crossbars 20A, 20B. Each of the first crossbar 20A and the second crossbar 20B has a front surface 23 and an opposed back surface 24 and the one or more image sections 3A, 3B are provided on one or both of the front surface 23 and the back surface 24.

While it has been disclosed herein that welding may damage some image sections if those image sections have been painted or applied by way of a decal onto the first and second crossbars, it will be understood that in other instances welding is one possible method by which the first and second crossbars and connector rods may be secured together if the image sections are applied by other methods and will not be damaged by the heat applied to the crossbars and rods.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

What is claimed:

1. A method of manufacturing a decorative grating, comprising steps of:
   providing a first crossbar and a second crossbar;
   placing the first and second crossbars a spaced distance from each other; and
   providing one or more image sections on one or both of the first and second crossbars, wherein the one or more image sections together form an image that is visible a distance away from the first and second crossbars;
   whereby the image sections are formed by: painting, printing, embossing, stamping, 3D printing, chemically etching or applying a decal thereon.

2. The method of claim 1, wherein each of the first crossbar and the second crossbar has a front surface and an opposed back surface and the one or more image sections are provided on one or both of the front surface and the back surface.

3. The method of claim 2 further comprising a step of making a plurality of holes through the first and second crossbars; wherein the holes extend between the front and back surface thereof.

4. The method of claim 3, further comprising the steps:
positioning the first and second crossbars parallel to each other;
aligning the holes in the first and second crossbars with each other to form pairs of aligned holes; and
inserting a connector rod through each pair of aligned holes.

5. The method of claim 4, further comprising a step of
applying a pinching force to sections of each connector rod;
deforming the sections of the connector rod; and
locking the first and second crossbars and the connector rods together.

6. The method of claim 1, wherein, subsequent to the step of providing the one or more image sections on one or both of the first and second crossbars, the method further comprises a step of providing a protective coating over the one or more image sections.

7. The method of claim 1, wherein the step of positioning the first and second crossbars is further accomplished by orienting the first and second crossbars at right angles to each other.

8. The method of claim 1, further comprising connecting the first and second crossbars together using a non-heat oriented method of securement.

9. A method of manufacturing a decorative grating, comprising steps of:
providing a first crossbar and a second crossbar;
placing the first and second crossbars at an angle relative to each other; and
providing one or more image sections on one or both of the first and second crossbars, wherein the one or more image sections together form an image that is visible a distance away from the first and second crossbars;
whereby the image sections are formed by: painting, printing, embossing, stamping, 3D printing, chemically etching or applying a decal thereon.

10. The method of claim 9, wherein each of the first crossbar and the second crossbar has a front surface and an opposed back surface and the one or more image sections are provided on one or both of the front surface and the back surface.

11. The method of claim 9, further comprising a step of making a plurality of notches on each of the first and second crossbars.

12. The method of claim 11, wherein the step of making the plurality of notches includes making a first notch on the first crossbar and making a first notch on the second crossbar; and wherein the method further comprises a step of interlocking the first notch on the first crossbar in the first notch on the second crossbar.

13. The method of claim 9, wherein the step of placing the first and second crossbars at the angle comprises perpendicularly crossing the first and second crossbars.

14. A decorative grating assembly, comprising:
a plurality of crossbars spaced a distance from each other; and
one or more image sections provided on one or more of the plurality of crossbars, wherein the image sections together, when seen from a distance, form an image on the grating assembly;
whereby the image sections include any one of: a painting, a printing, a 3D printing, an embossed or stamped image, a chemical etching or a decal.

15. The method of claim 14, wherein each of the plurality of crossbars has a front surface and an opposed back surface and the one or more image sections are provided on one or both of the front surface and the back surface.

16. The decorative grating assembly of claim 14, one or more of the plurality of the crossbars is free of image sections.

17. The decorative grating assembly of claim 15, further comprising a frame that at least partially surrounds the plurality of crossbars.

18. The grating assembly of claim 14, wherein the plurality of crossbars each define one or more holes therein.

19. The grating assembly of claim 17, further comprising a plurality of connector rods, wherein the connector rods are inserted through the holes on the crossbars.

20. The grating assembly of claim 19, wherein each connector rod includes a section that is positioned between two adjacent crossbars; and wherein the section is deformed so as to not pass through the holes in the adjacent crossbars.

21. The grating assembly of claim 14, wherein the crossbars each define a plurality of notches therein; and wherein a first set of the plurality of crossbars are secured to a second set of the plurality of crossbars by interlocking the notches together.

22. The grating assembly of claim 21, wherein the first set of crossbars and the second set of crossbars are perpendicularly crossed with each other.

* * * * *